US011270034B1

(12) United States Patent
Shen et al.

(10) Patent No.: US 11,270,034 B1
(45) Date of Patent: Mar. 8, 2022

(54) METHOD AND SYSTEM FOR KITCHEN CABINET LAYOUT

(71) Applicant: Shiyuan Shen, Richmond (CA)

(72) Inventors: Shiyuan Shen, Richmond (CA); Hao Zhang, Beijing (CN); Donglin Li, Beijing (CN)

(*) Notice: Subject to any disclaimer, the term of this patent is extended or adjusted under 35 U.S.C. 154(b) by 503 days.

(21) Appl. No.: 16/240,694

(22) Filed: Jan. 4, 2019

Related U.S. Application Data

(60) Provisional application No. 62/613,867, filed on Jan. 5, 2018.

(51) Int. Cl.
| | | |
|---|---|---|
| *G06F 17/10* | (2006.01) | |
| *G06F 30/13* | (2020.01) | |
| *G06F 3/0482* | (2013.01) | |
| *G06N 20/00* | (2019.01) | |
| *G06N 7/08* | (2006.01) | |

(52) U.S. Cl.
CPC ............ *G06F 30/13* (2020.01); *G06F 3/0482* (2013.01); *G06N 7/08* (2013.01); *G06N 20/00* (2019.01)

(58) Field of Classification Search
CPC .............................. G06F 17/50; G06F 17/5004
USPC ............................................................ 703/1
See application file for complete search history.

(56) References Cited

U.S. PATENT DOCUMENTS

| | | | |
|---|---|---|---|
| 8,239,173 B2 | 8/2012 | Frohlich et al. | |
| 8,253,731 B2 * | 8/2012 | Hoguet .................. | G06F 16/904 345/419 |
| 8,668,498 B2 | 3/2014 | Calman et al. | |
| 9,355,470 B2 | 5/2016 | Merrell et al. | |
| 2011/0061011 A1 * | 3/2011 | Hoguet ............... | G06Q 30/0603 715/769 |
| 2012/0259743 A1 * | 10/2012 | Pate, Jr. ................. | G06Q 30/00 705/27.2 |
| 2014/0278274 A1 | 9/2014 | Osher et al. | |
| 2016/0070824 A1 * | 3/2016 | Yao ......................... | G06F 30/13 703/1 |

OTHER PUBLICATIONS

Merrell, Paul et al., "Interactive Furniture Layout Using Interior Design Guidelines", ACM Transactions on Graphics (TOG), Jul. 2011, vol. 30, Issue 4.

Fisher, Matthew et al., "Context-Based Search for 3D Models", ACM Transactions on Graphics (TOG), Dec. 2010, vol. 29, Issue 6.

(Continued)

*Primary Examiner* — Andy Ho

(57) ABSTRACT

A computer-implemented method and system for generating a layout of kitchen cabinets is provided. The method and system can be used for recommending an acceptable kitchen cabinet layout that would optimize both functionality and visual appearance of a kitchen. The method includes the steps of receiving, by a computer, attributes that define a virtual kitchen and receiving, by the computer, attributes and placement information for an appliance. The computer generates the virtual kitchen and populates the virtual kitchen with cabinets. The computer generates a first suggestion for kitchen cabinet layout, wherein the first suggestion satisfies the criteria of balance, economical and minimization of filler space. The step of generating the first suggestion can be done by using a neural-network-based evaluation function combined with a search algorithm.

8 Claims, 14 Drawing Sheets

(56) References Cited

OTHER PUBLICATIONS

Tutenel, Tim et al., "Rule-based layout solving and its application to procedural interior generation", Delft University of Technology, Delft, The Netherlands, Conference Paper, Jan. 2009.

Nakajima, Toyohisa et al., "Office Layout Support System using Interactive Genetic Algorithm", 2006 IEEE Congress an Evolutionary Computation, Sheraton Vancouver Wall Centre Hotel, Vancouver, BC Canada, Jul. 16-21, 2006.

* cited by examiner

METHOD AND SYSTEM FOR KITCHEN CABINET LAYOUT

RELATED APPLICATIONS

This application claims priority from and the benefit under 35 USC 119(3) in association with U.S. application No. 62/613,867 filed 5 Jan. 2018 which is hereby incorporated herein by reference.

TECHNICAL FIELD

The present disclosure relates to computer implemented methods and systems for generating a layout of objects within a volume. In particular, the present disclosure relates to computer implemented methods and systems for generating a layout of kitchen cabinets in a kitchen volume.

BACKGROUND

The kitchen is often the most used room in a home and it hosts a variety of connected elements including appliances, cabinets, countertops and fixtures. Kitchen layout presents unique challenges at least because an effective kitchen layout encompasses accommodating flexibility in placing appliances, providing a functional and ergonomic work flow layout, and optimizing visual appearance. For example, an effective kitchen layout should, at least desirably, provide sufficient cabinet storage and countertop space, which in turn align with well-positioned appliances, as well as collectively support a functional and ergonomic environment. An effective kitchen layout should also, at least desirably, provide a visually pleasing environment.

When designing a kitchen layout, a skilled designer typically considers several factors, such as prominent visual and/or architectural features of one's home, the dimensions of the kitchen, the locations of electrical outlets, how the home owner uses or would like to use the kitchen, how many people will likely use the kitchen at one time, and the home owner's preferred cooking and storage style. The skilled designer typically weighs and balances these factors to create an effective kitchen layout that aims to optimize both the functionality and visual appearance of a kitchen. Typically, a consumer will want the designer to consider cost criteria as well. The knowledge and expertise involved in optimally balancing these factors are unlikely to be possessed by amateur designers. Instead, such amateur designers typically rely on intuition and often create functionally ineffective and/or visually inferior kitchen layouts.

Computer implemented systems are available to assist a user to create and visualize a kitchen layout. Some example systems include 2020 Design™'s kitchen and bathroom software and KitchenDraw™'s kitchen design software. However, such systems do not mitigate a user's lack of knowledge and expertise required to design an acceptable kitchen layout. Such systems simply display a user-inputted design in three dimensions and do not automatically generate kitchen layouts, let alone kitchen layouts that optimize a number of criteria, including, for example, functionality, visual appearance and/or cost.

There is a general desire for an improved computer-implemented method and/or system for generating a layout of kitchen cabinets. There is also a general desire for an improved computer-implemented method and/or system for generating an acceptable kitchen cabinet layout that would optimize (e.g. according to some optimization metrics) a number of criteria, including, for example, functionality, visual appearance and cost.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the present disclosure provides a computer-implemented method and system for generating a layout of kitchen cabinets.

Another aspect of the present disclosure provides a computer-implemented method and system for recommending an acceptable kitchen cabinet layout that is optimized based on a number of criteria, such as, by way of non-limiting example, functionality of the cabinet layout, visual appearance of a kitchen incorporating the cabinet layout, price of the cabinet layout, sub-combinations of these criteria, and/or the like.

Another aspect of the present disclosure provides a computer-implemented method for generating a suggested layout of kitchen cabinets. The method uses a computer to receive spatial attributes of a virtual kitchen. The computer also receives positional and dimensional information relating to appliances selected by a user. Based on the received attributes of the kitchen and the information relating to the user-selected appliances, the computer defines a cabinet space to be occupied by kitchen cabinets and selects cabinets from among a plurality of cabinets in a cabinet library accessible to the computer, thereby automatically generating a first suggested layout of cabinets that occupies the cabinet space. The computer displays the first suggested cabinet layout either in a two- or three-dimensional manner.

In some embodiments, when the computer generates the first suggested layout, it performs a computational optimization which minimizes a cost function. The cost function has a first cost term that assigns cost based on symmetry of the cabinets in a potential cabinet layout, a second cost term that assigns costs based on price of the cabinets in the potential cabinet layout and a third cost term that assigns cost based on an amount of space in the potential cabinet layout that is not occupied by cabinets. The optimization may be subject to a maximum cost constraint $\psi$, so that $p<\psi$ In some embodiments, the cost function has the form of $$v = k_1 s + k_2 p + k_3 f \qquad (1)$$

where $k_1 s$ represents the first cost term, $k_2 p$ represents the second cost term, $k_3 f$ represents the third cost term and $k_1$, $k_2$, and $k_3$ are configurable constants.

The expression s measures or otherwise indicates whether a layout is visually balanced, and is given by $$s = \sum_{j=1}^{N} \sum_{i=1}^{N} \alpha_{i,j} |L_i - L_j| + \sum_{r=1}^{M} \sum_{q=1}^{M} \alpha_{qr} |L_q - L_r| \qquad (2)$$

The expression p measures the cost of purchasing and/or installing cabinets according to a particular cabinet layout, and is given by $$p = \sum_{i=1}^{M+N} \beta_i p_i \qquad (3)$$

The expression $f$ measures the total waste space occupied by filler between two cabinets, and is given by $$f = \sum_{i=1}^{P} \gamma_i f_i \qquad (4)$$

In some embodiments, the sum of $k_1$, $k_2$, and $k_3$ is unity.

In some embodiments, $k_1$, $k_2$, and $k_3$ are user-configurable.

In some embodiments, the first suggested layout is modified by a user. Such modification includes a change of at least one cabinet relative to the first suggested cabinet layout. The computer then selects cabinets from among the plurality of cabinets in the cabinet library and generates a second suggested layout of cabinets that occupies the cabinet space. The second suggested cabinet layout includes the change of the at least one cabinet relative to the first suggested cabinet layout. The computer may perform a computational optimization which minimizes the cost function subject to a constraint that the second suggested cabinet layout must comprise the change of the at least one cabinet relative to the first suggested cabinet layout when generating the second suggested layout.

In some embodiments, the computer represents the first suggested cabinet layout as an upper cabinet array and a lower cabinet array, each of the upper and lower cabinet arrays indexed by an index corresponding to a width dimension and including, for each index in the upper and lower cabinet arrays, the upper and lower cabinet arrays comprise a cabinet identifier that identifies a cabinet from within the cabinet library. The upper and lower cabinet arrays may have a kitchen feature field which includes information about kitchen features in the cabinet space.

In some embodiments, when generating the first suggested layout, the computer trains an artificial neural network to predict a score for a given input cabinet layout. The training process involves providing the artificial neural network with a plurality of example training layouts which have been scored by human experts. The computer starts from a first cabinet and iteratively selects a next cabinet to be added until the first suggested layout is complete. The process of selecting the next cabinet to be added includes performing a Monte Carlo search tree process to determine the next cabinet to be added and the Monte Carlo search tree process is based on scores provided by the trained artificial neural network. A similar process may be used to generate a second suggested layout that considers a user-modification of the first suggested layout that includes a change of at least one cabinet relative to the first suggested cabinet layout. When generating the second suggested layout, the computer starts from the change of the at least one cabinet relative to the first suggested cabinet layout and iteratively selects a next cabinet to be added until the second suggested layout is complete. The Monte Carlo search tree process is used to determine the next cabinet to be added and the Monte Carlo search tree process is based on scores provided by the trained artificial neural network.

In some embodiments, the computer generates the first suggested layout by generating plurality of cabinet layouts and assigning each generated cabinet layout a rank; and selecting one of the generated cabinet layouts to be the first suggested cabinet layout based on the assigned ranks.

Another aspect of the present disclosure provides a system comprising a suitably configured processor and a display, the system configured to perform a method for generating a layout of kitchen cabinets.

Another aspect of the present disclosure provides a non-transitory computer-readable medium including instructions that, when executed by a processor, cause the processor to implement a method for generating a layout of kitchen cabinets.

Another aspect of the present disclosure provides a computer-implemented method and system for generating a layout of kitchen cabinets.

Another aspect of the present disclosure provides a computer-implemented method and system for recommending an acceptable kitchen cabinet layout that is optimized based on a number of criteria, such as, by way of non-limiting example, functionality of the cabinet layout, visual appearance of a kitchen incorporating the cabinet layout, price of the cabinet layout, sub-combinations of these criteria, and/or the like.

Another aspect of the present disclosure discloses a computer-implemented method for generating a suggested layout of kitchen cabinets. The method has the steps of receiving, by a computer, information relating to attributes of a virtual kitchen and receiving, by the computer, information relating to appliances selected by a user. Based on the received information, the computer defines a cabinet space to be occupied by kitchen cabinets. The computer generates a plurality of layouts of kitchen cabinets by populating the cabinet space with kitchen cabinets. The computer evaluates the layouts based on a formula $$v = k1 \times s + k2 \times p + k3 \times f$$

wherein v is an evaluation function, s is a symmetric score, p is a price score, $f$ is a filler space score, and k1, k2 and k3 are predetermined constants, wherein a first suggested layout has the lowest value of v. The computer displays the first suggested layout either in a two- or three-dimensional manner.

A particular embodiment of the present disclosure uses a neural-network-based evaluation function combined with a search algorithm to generate the first suggested layout of kitchen cabinets.

In some embodiments, the present disclosure sets up predetermined cabinet positioning rules for accommodating limited flexibility in appliances, wherein the predetermined cabinet positioning rules defines a cabinet space to be occupied by cabinets. An artificial intelligence ("AI") engine can be used to recognize patterns of the cabinet space and generate the first suggested layout based on past accepted layouts.

In some embodiments, the present disclosure discloses a computer-implemented method for generating a suggested layout of kitchen cabinets. The method uses a combination of machine learning and tree search techniques.

Another aspect of the present disclosure provides a computer-implemented method for generating a suggested layout of kitchen cabinets. The method involves receiving, by a computer, information relating to attributes of a virtual kitchen and receiving, by the computer, information relating to appliances selected by a use. based on the received information relating to the attributes of the kitchen and the user-selected appliances, the computer defines a cabinet space to be occupied by kitchen cabinets and converts the cabinet space into a plurality of one-dimensional arrays extending from a corner starting point. The computer generates the cabinet space into a plurality of one-dimensional arrays extending from a corner starting point. It evaluates different layouts based on a formula:

$$v = k1 \times s + k2 \times p + k3 \times f$$

wherein v is an evaluation function, s is a symmetric score, p is a price score, $f$ is a filler space score, and k1, k2 and k3 are predetermined constants, wherein a first suggested layout has the lowest value of v. It then displays the first suggested layout either in a two- or three-dimensional manner.

In some embodiments, the plurality of one-dimensional arrays occupied by cabinets are converted into images by assigning a RGB colour value to each point on the one-dimensional array illustrating the selected cabinet occupying a particular spot in the defined cabinet space. The images can be used by a convolutional neural network to determine a probability that a particular layout would be recommended as an optimal layout.

Another aspect of the present disclosure provides a computer-implemented method for generating a suggested layout of kitchen cabinets. The method involves inputting kitchen attributes into a computer to define a virtual kitchen; selecting and placing an appliance in the virtual kitchen according to appliance positioning rules at least partly dependent on the kitchen attributes; requesting layouts of kitchen cabinets; and receiving a first suggested layout, wherein the first suggested layout has the lowest value of v of the layouts based on a formula:

$$v = k1 \times s + k2 \times p + k3 \times f$$

wherein v is an evaluation function, s is a symmetric score, p is a price score, $f$ is a filler space score, and k1, k2 and k3 are predetermined constants.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
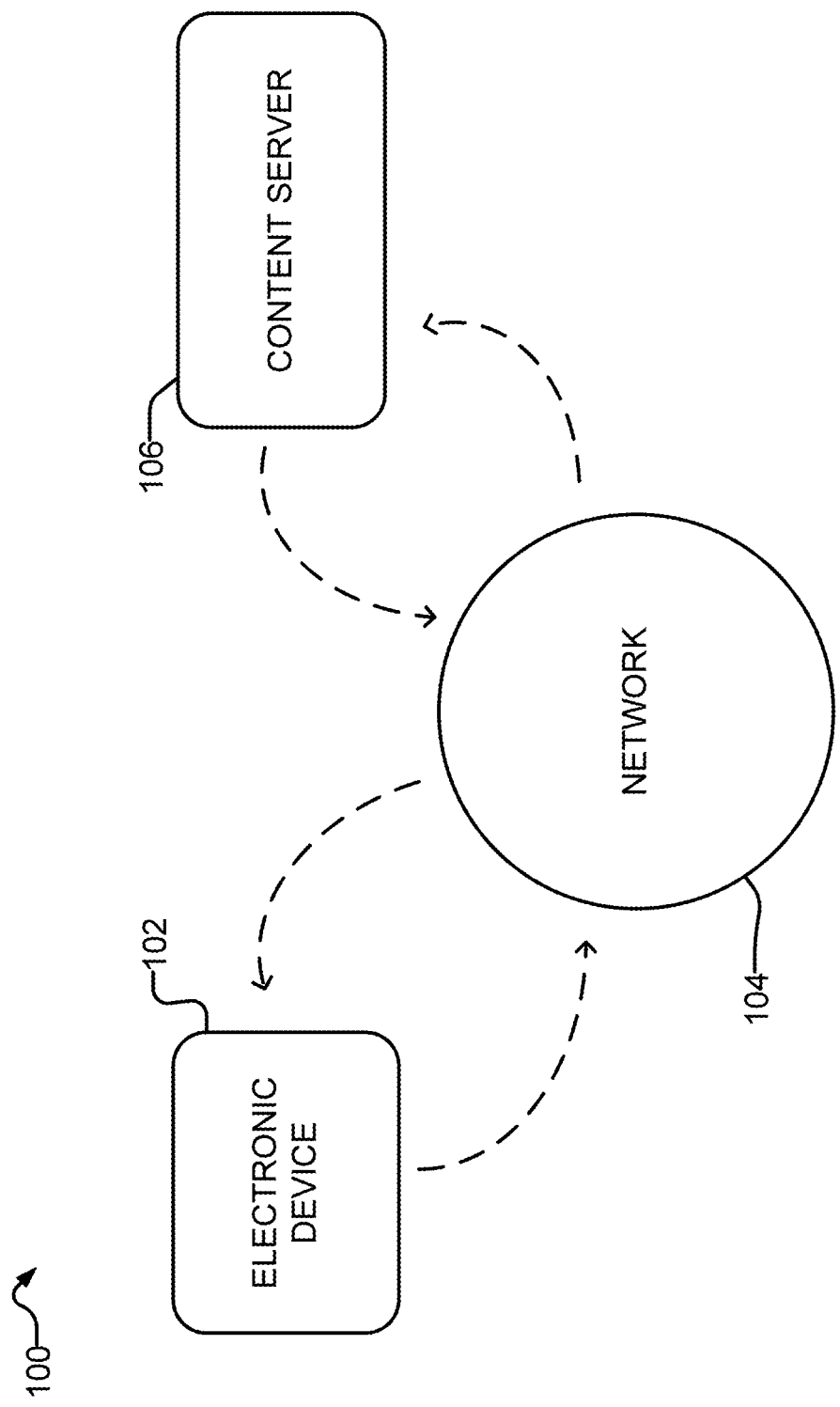
FIG. 1 is a schematic view of a networked system on which a method according to an example embodiment can be practiced.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As used in the present disclosure, the term "appliance" refers to an electrically powered, gas powered, and/or mechanical equipment for use in the kitchen. Some examples of appliances include dishwashers, refrigerators, stove/oven ranges, wall ovens, microwave ovens, cooktops, hood fans, sinks and the like. Many appliances are accompanied by manufacturers' guidelines to instruct a user on how to install, use and service the appliances properly.

As used herein, the term "cabinet" refers to cupboards, drawers and the like built into a kitchen. "Upper cabinets" are the cabinets that are secured against the wall and/or hung from the ceiling, typically above a countertop. "Base cabinets" are the cabinets that sit on the floor, typically below a countertop. Base cabinets may be secured against the wall, or may be freestanding in the case of a peninsula or island.

As used herein, the term "filler" refers to the materials that occupy spaces between adjacent cabinets to cover an opening therebetween. Filler can be pieces of wood, plastic and the like. Filler can fill the volume of a space between cabinets or can simply cover the otherwise visible opening to such a volume.

As used herein, the term "cabinet space" refers to a space or volume to be occupied by kitchen cabinets. The cabinet space is within a kitchen.

Many amateur designers lack the knowledge and expertise required to create an acceptable kitchen layout that aims to optimize the cabinet layout according to a number of criteria, such as, by way of non-limiting example, functionality of the cabinet layout, visual appearance of a kitchen incorporating the cabinet layout, price of the cabinet layout and/or the like. Such amateur designers could often use assistance in selecting and positioning kitchen cabinets. Computer-implemented systems and methods described herein automatically (i.e. by a computer-implemented method and/or system) generate a layout of kitchen cabinets. Those skilled in the art will recognize that the embodiments of the present disclosure may involve the use of both hardware and software elements to construct and operate the method according to the embodiments of the present disclosure. Embodiments described herein can be used to automatically recommend an acceptable kitchen cabinet layout that would optimize (e.g. according to some optimization metric) a number of criteria, including, for example, functionality of the cabinet layout, visual appearance of a kitchen incorporating the cabinet layout, price of the cabinet layout and/or the like. Embodiments disclosed herein may comprise the combination of: (i) defining a kitchen space; (ii) defining a cabinet space to be occupied by kitchen cabinets; (iii) generating a suggested layout of kitchen cabinets for the defined cabinet space; and (iv) displaying the suggested layout.

As will be appreciated by those skilled in the art, embodiments of the present disclosure may be embodied as a system, method, or computer program product. Accordingly, embodiments of the present disclosure may take the form of an entirely hardware embodiment, an entirely software embodiment (including firmware, resident software, microcode, etc.), or an embodiment combining software and hardware. Furthermore, embodiments of the present system may take the form of a computer program embodied in one or more computer readable medium(s) having computer readable program code embodied thereon.

Embodiments of the present disclosure are described below with reference to flowchart illustrations and/or block diagrams of methods, apparatus, and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

FIG. 1 schematically illustrates a networked system 100 on which a computer-implemented method for generating a layout of kitchen cabinets can be practiced according to an example embodiment. Networked system 100 includes an electronic device 102, a network 104, and a content server 106. In some embodiments, there are additional electronic devices 102, networks 104, and/or content servers 106.

In some embodiments, electronic device 102 and content server 106 include any combination of one or more computer readable medium(s). The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium would further include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present disclosure, a computer readable storage medium may comprise any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Electronic device 102 is configured for a user to input attributes of a kitchen and to select appliances, to thereby allow a cabinet space to be defined. In some embodiments, the parameters (e.g. physical dimensions, general layout and/or the like) of a cabinet space may be defined by a user. In some embodiments, a user may input parameters (e.g. physical dimensions, general layout and/or the like) of a kitchen space or kitchen volume and the locations and dimensions of the appliances and then electronic device 102 may automatically define the parameters of the cabinet space. Electronic device 102 is also configured to display a suggested layout of kitchen cabinets. In some embodiments, electronic device 102 comprises a computer, a smart phone, and/or a tablet.

Network 104 may include any suitable types of network, including a local area network (LAN), a wide area network (WAN), an Internet Protocol Multimedia Subsystem network (IMS), an intranet or a private network.

Content server 106 is configured to provide content to electronic device 102.

In some embodiments, electronic device 102 is connected to network 104 via wired, wireless, optical fiber cable, RF, and the like, or any suitable combination of the foregoing connections, and thereby is operatively connected to content server 106, either directly or indirectly. In other embodiments, electronic device 102 is operatively connected to content server 106 through a computer-readable media, data stream, file, or suitable communication channel.

Figure 2:
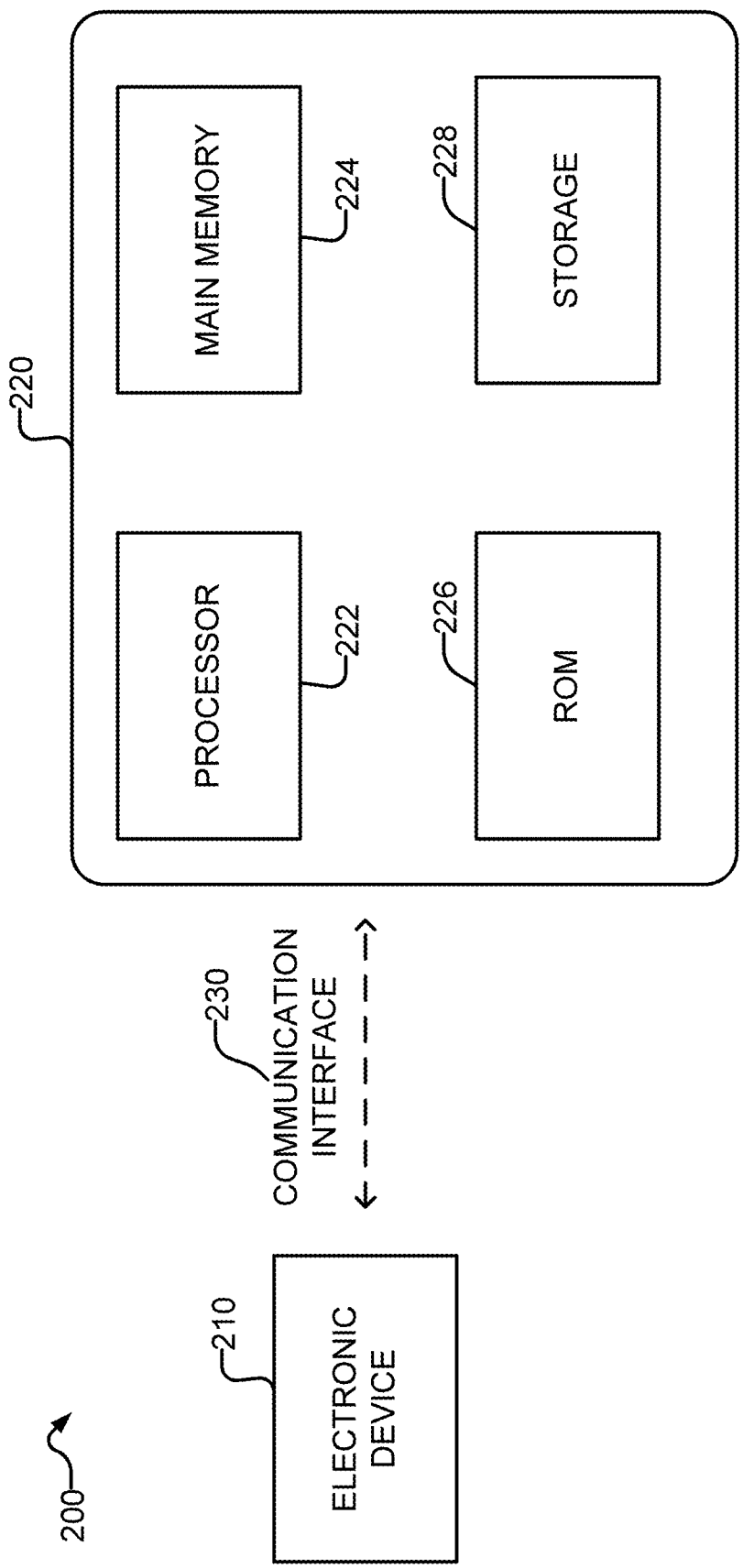
FIG. 2 is a schematic view of a computer-implemented system that can be used to implement a method according to an example embodiment.
Figure 3:
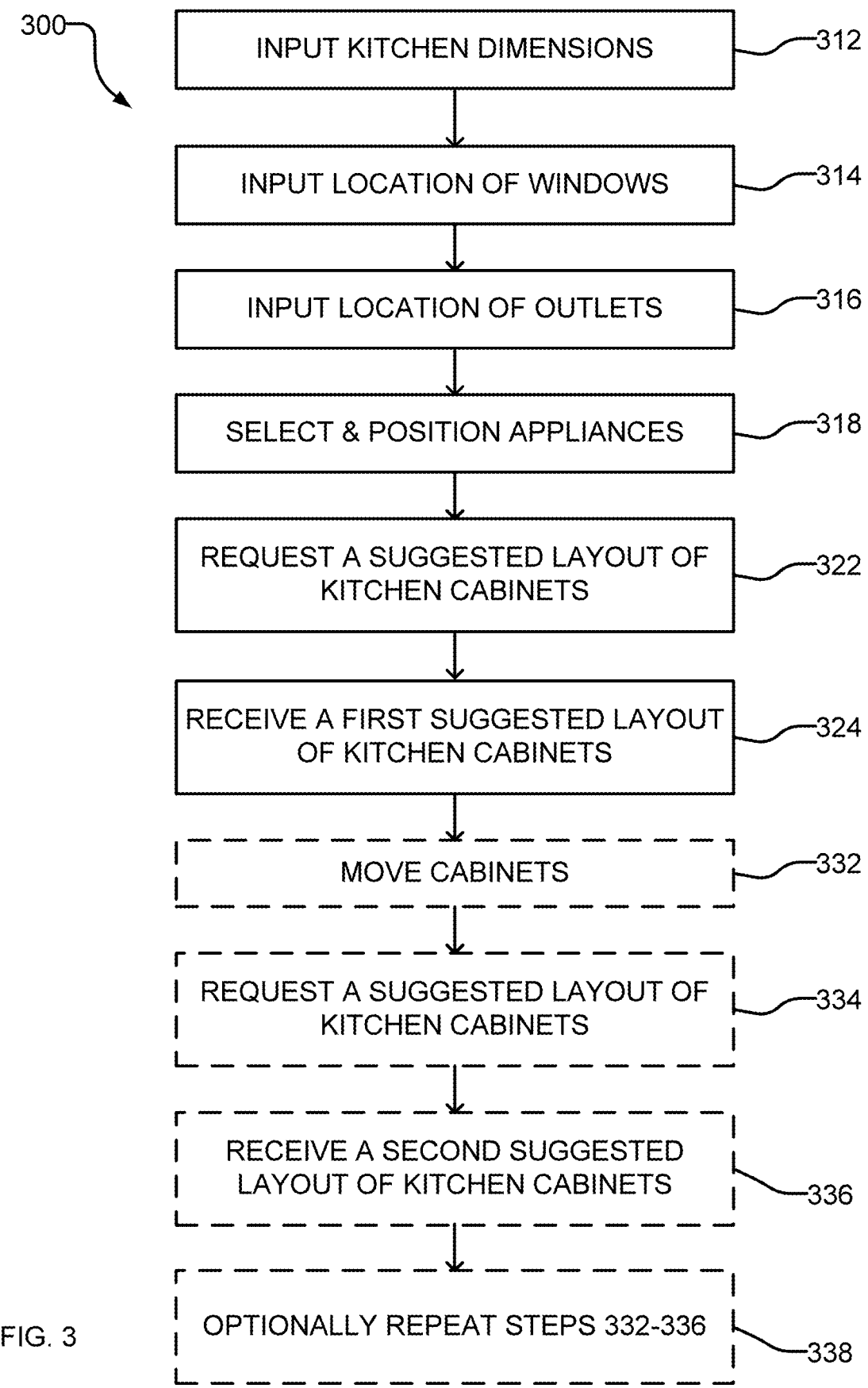
FIG. 3 is a flow diagram of a method for automatically generating kitchen cabinet layouts according to an example embodiment.

FIG. 2 shows a computer-implemented system 200 that can be used to implement a method of automatically generating kitchen cabinet layouts according to an example embodiment like the method shown in FIG. 3. Computer-implemented system 200 includes an electronic device 210 and a computing device 220. Electronic device 210 and computing device 220 are in communication with each other via any suitable communication interface 230. In other embodiments, some or all of the components of computing device 220 are integrated with (e.g. are a part of) electronic device 210.

Electronic device 210 is configured to allow a user to input parameters of a kitchen volume and positions/dimensions of appliances into computing device 220, to thereby define a cabinet space to be occupied by kitchen cabinets. Electronic device 210 is also configured to display a suggested layout of kitchen cabinets. In some embodiments, electronic device 210 is a computer, a smart phone, and/or a tablet.

Computing device 220 of the illustrated embodiment includes a processor 222, a main memory 224, a read-only memory (ROM) 226 and a storage device 228. Computing device 220 may be suitably programed by computer program code for carrying out operations for aspects of the present disclosure. The computer program code may be written in any combination of one or more programming languages, including, without limitation, an object oriented programming language such as Java, Smalltalk, C++, or the like or conventional procedural programming languages, such as the "C"' programming language, AJAX, PHP, HTML, XHTML, Ruby, CSS, or similar programming languages. The programming code may be configured in an application, an operating system, as part of a system firmware, or any suitable combination thereof. The programming code may execute entirely on the user's computer (e.g. electronic device 210), partly on the user's computer and partly on computing device 220, as a standalone software package executed on computing device 220, partly on the user's computer (e.g. electronic device 210) and partly on a remote computer (e.g. computing device 220), or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus, or other devices to produce a computer-implemented process such that the instructions which execute on the computer or other programmable apparatus provide processes for implementing the functions/acts specified in the flowchart and/or block diagrams.

Processor 222 can be a processor of a general purpose computer, special purpose computer, or other programmable data processing apparatus. Processor 222 may be able to interpret and execute computer program instructions to implement the methods and/or steps shown in FIGS. 3-5 and/or otherwise shown and/or described herein.

Main memory 224, ROM 226 and storage device 228 may comprise any suitable computer readable storage medium. Main memory 224 may be configured to store information and instructions for execution by processor 222. ROM 226 may be configured to store static information and instructions for use by processor 222. Storage device 228 may include a recording medium.

FIG. 3 shows a computer-implemented method 300 for automatically generating a layout of kitchen cabinets according to an example embodiment. Computer-implemented method 300 suggests an acceptable kitchen cabinet layout that would optimize (e.g. according to some suitable optimization metric(s)) a number of criteria, including by way of non-limiting example, functionality of the cabinet layout, visual appearance of a kitchen incorporating the cabinet layout, price of the cabinet layout, sub-combinations of these criteria, and/or the like. Computer-implemented method 300 is described from the perspective of a user. For the purposes of explanation, method 300 is described as being implemented by computing device 200, it being understood that with suitable modification method 300 may be implemented by system 100.

At blocks 312, 314, 316, and 318, a user inputs the attributes of a kitchen and selects appliances.

At blocks 312, 314 and 316, a user defines a kitchen by inputting kitchen attributes/parameters into an electronic device (e.g. electronic device 210) via a user interface. At block 312, the user inputs kitchen floor and wall (e.g. volume) dimensions. At block 314, the user inputs kitchen window and pass through dimensions and locations. At block 316, the user inputs outlet types and locations. Outlet types include, for example, electrical, gas and plumbing outlets.

A user may optionally define other characteristics of the kitchen, such as colour and design style.

In some embodiments, a user defines kitchen attributes in part by choosing a particular kitchen style or layout from a library of standard kitchen layouts. The standard or customized kitchen layout may comprise, by way of non-limiting example: U-shaped, L-shaped, G-shaped, or I-shaped. The user is then presented with an opportunity to revise the chosen standard kitchen, e.g. to modify the kitchen dimensions. The kitchen may also have one or more islands and/or peninsulas whose dimensions and locations may be defined in one of blocks 312, 314, 316.

In some embodiments, a user further defines kitchen attributes by drawing a customized kitchen (e.g. using a suitable drawing software interface).

At block 318, a user selects appliances. In some embodiments, appliances are described by a set of attributes, such as dimensions, orientation, accessible space and centre. Appliances can be chosen from a library of specific and/or representative appliances which may be stored in main memory 224 or storage 228 of computing device 220 or memory otherwise accessible to computing device 220. In some embodiments, the library of appliances can be customized to a particular user, for example based on one's preference as to manufacturer, supplier, price range, customer rating, specifications (e.g. style, colour, capacity, dimensions and performance characteristics), and/or the like.

In some embodiments, after a user chooses an appliance from the library, the user may position the appliance in the kitchen at a desired location.

In some embodiments, after a user chooses an appliance from the library, the computing device 220 automatically positions the appliance in the kitchen at a recommended location. In some such embodiments, if the user does not prefer the appliance position selected by computing device 220, then the user may re-position the appliance as desired.

Whether the user initially positions the appliances, or later re-positions the appliances, the user's ability to position appliances may be constrained by appliance positioning rules stored in and applied by computing device 220. These appliance positioning rules may be at least partially derived from the inputted kitchen attributes and the selected appliances themselves. These appliance positioning rules may be additionally or alternatively derived from local building codes. For example, a microwave oven may require a dedicated electrical circuit, which may constrain its location within the kitchen. These appliance positioning rules may also applied by computing device 220 when computing device 220 automatically positions appliances at recommended locations. Examples of appliance positioning rules include:

appliances cannot be placed where they would obstruct or interfere with the use of any doors, walkways, windows or outlets;

hood fans should be placed directly above the cooktop (e.g. range);

sinks must be placed in proximity to plumbing outlets, and in particular the centerline of the sink should be positioned in proximity to the drainpipe;

sinks should preferably be centered below a window;

gas appliances must be placed in proximity to gas outlets;

electrical appliances must be placed in proximity to electrical outlets the refrigerator, the sink and the cooktop (e.g. range) should form a "work triangle";

the cooktop should not be placed directly beside a fridge; and the dishwasher should be placed in proximity to the sink.

Examples of appliance positioning rules also include installation instructions for appliances.

At block 322, a user requests a suggested layout of kitchen cabinets. The kitchen attributes and the appliance positioning rules allow computing device 220 to define a cabinet space. A cabinet space may be considered to be the available space to be occupied by kitchen cabinets in the kitchen volume after placement of appliances.

The kitchen attributes and the appliance positioning and dimensions allow computing device 220 to define a cabinet space. In some embodiments, the cabinet space has an upper portion extending downwardly from the ceiling, and a bottom portion extending upwardly from the floor. In some embodiments, each one of the upper portion and the bottom portion are specified to have a height of 34.5 inches, a depth of 24 inches and variable widths. The upper portion is for positioning upper cabinets and the bottom portion is for positioning base cabinets. The upper portion and the bottom portion may not be connected. In some embodiments, particular regions of the cabinet space may comprise merged upper and lower portions—e.g. to accommodate lower cabinets with tall dimensions (e.g. heights greater than 34.5 inches), also known as full height cabinets or full height lower cabinets.

Computing device 220 may store or otherwise have access to a cabinet library. In some embodiments, the cabinet library may be stored in main memory 224 and/or storage 228 of computing device 220. The cabinet library may comprise upper and lower cabinets with a height of 34.5 inches, a depth of 24 inches and variable widths. In some embodiments, the widths range between 9 inches to 39 inches in 3-inch increments. The cabinet library in some embodiments may comprise full height lower cabinets with tall dimensions (e.g. heights greater than 34.5 inches).

Some cabinets have drawers, some cabinets have doors, some cabinets are open-faced. Some cabinets are to be installed in a corner.

At block 322, the user requests a suggested layout of kitchen cabinets. Such request prompts the computing device 220 to automatically populate the cabinet space with cabinets according to cabinet positioning rules. Cabinet positioning rules stored in and applied by computing device 220 constrain its positioning of cabinets. Non-limiting examples of cabinet positioning rules include:

to provide sufficient cleanup and food preparation areas, cabinets should provide at least a 24-inch-wide area to one side of the sink and at least an 18-inch-wide area on the other side;

microwave oven cabinets should be positioned at least 15-inch above the floor;

cabinets below the sink must be cupboards rather than drawers; and to provide a clearance distance of at least 24 inches above a cook top, the cabinet for housing a hood fan should be at least 12 inches shorter than adjacent cabinets.

In some embodiments, computing device 220 pairs certain cabinets with a particular appliance. For example, when a particular stove or refrigerator is chosen and positioned by a user, computing device 220 is able to access a subset of cabinets and automatically positions them in the kitchen according to cabinet positioning rules. Additionally, only some cabinets are available to be positioned above a sink by computing device 220.

To provide a suggested layout of kitchen cabinets, in some embodiments, computing device 220 general a plurality of possible layouts and then rank them according to one or more metrics which characterize criteria such as, for example, the functionality of a cabinet layout, the visual appearance of a kitchen incorporating the cabinet layout, the price of the cabinet layout and/or the like, as described further below. Other criteria can include:

balance;

the cabinets on each side of sink should be symmetrical;

the cabinets on each side of the stove should be symmetrical;

upper cabinets should align with base cabinets;

the dimensions of the chosen appliances should match the dimensions of the cabinets that house the respective chosen appliances;

when there is no window above a sink, the upper cabinet above the sink should have the same width as the sink. The height of the cabinet is shorter than its neighboring cabinets by some configurable amount (e.g. 10 inches). As such, when the top of the upper cabinet is levelled with adjacent upper cabinets, the bottom of the upper cabinet is higher than the bottom of the adjacent cabinets by the configurable amount;

functionality;

maximize storage space by incorporating corner cabinets;

maximize storage space by arranging cabinets in close proximity with each other, i.e. space filler between two cabinets should not exceed 3 inches;

prudence;

minimize overall cost by using bigger cabinets.

In some embodiments, computing device 220 perform a computational optimization to determine a cabinet layout that minimizes a cost function or equivalently maximizes an objective function, as described further below.

In some embodiments, computing device 220 uses a neural network in combination with the Monte Carlo Tree Search to provide a suggested layout of kitchen cabinets, as described further below.

At block 324, the user receives (from computing device 220) a suggested layout of kitchen cabinets. In some embodiments, the suggested layout is displayed for the user (e.g. on electronic device 210) either in a two- or three-dimensional manner.

At block 332, the user is presented with an opportunity to manipulate the suggested layout, for example by moving and placing cabinets as the user may desire. In some embodiments of block 332, a user may move and/or exchange cabinets within the block 324 suggested cabinet layout. Additionally or alternatively, as part of block 332, a user may select new or different cabinets from among the available cabinet library and may add to the block 324 suggested cabinet layout and/or exchange cabinets with those of the block 324 suggested cabinet layout. The user may choose not to modify the suggested layout. In some embodiments, the repositioning by the user may be constrained by the predetermined design rules. In some embodiments, block 332 (and subsequent blocks 334, 336) are optional.

In some embodiments, at block 324, the user receives more than one suggested layout that balances both functionality and visual appearance of a kitchen. Such multiple suggested cabinet layouts may have the same or similar rankings for functionality and visual appearance. For example, block 324 may involve presenting to a user a number of suggested cabinet layouts having a functionality and appearance metric above a configurable threshold.

At block 334, the user may request another suggested layout of kitchen cabinets based on their block 332 modifications. If such a second request is received, the second request may prompt the computing device 220 to i) lock in the modification(s) made by the user at block 332; ii) populate the remaining cabinet space with cabinets; and iii) rank different cabinet layouts according to the measure which quantifies functionality and visual appearance of the kitchen. For example, if the user changed the placement of a cabinet by moving the cabinet to a different location at block 332, computing device 220 may lock in the new placement of the cabinet. If the user changed a style of a cabinet, e.g. a cabinet with drawers instead of a cabinet with a door, colour and texture, computing device 220 may select other cabinets with the same style and populate the unoccupied cabinet space with the selected cabinets.

At block 336, the user may receive (from computing device 220) a second suggested layout of kitchen cabinets, the second suggested layout optimizing the functionality and visual appearance of the kitchen, while incorporating the user's modifications made at block 332. The second suggested layout of block 336 thus differs from the first suggested layout of block 324 in the sense that the second suggested layout of block 336 incorporates the user's block 332 modifications. In optional block 338, the method of blocks 332-336 may be repeated until a cabinet layout is accepted by the user.

In some embodiments, after the user accepts a suggested layout, either after block 324 or 336, the user is able to place an electronic purchase order for the cabinets in the suggested layout. In some embodiments, payment for the cabinets triggers delivery and installation services.

Figure 4:
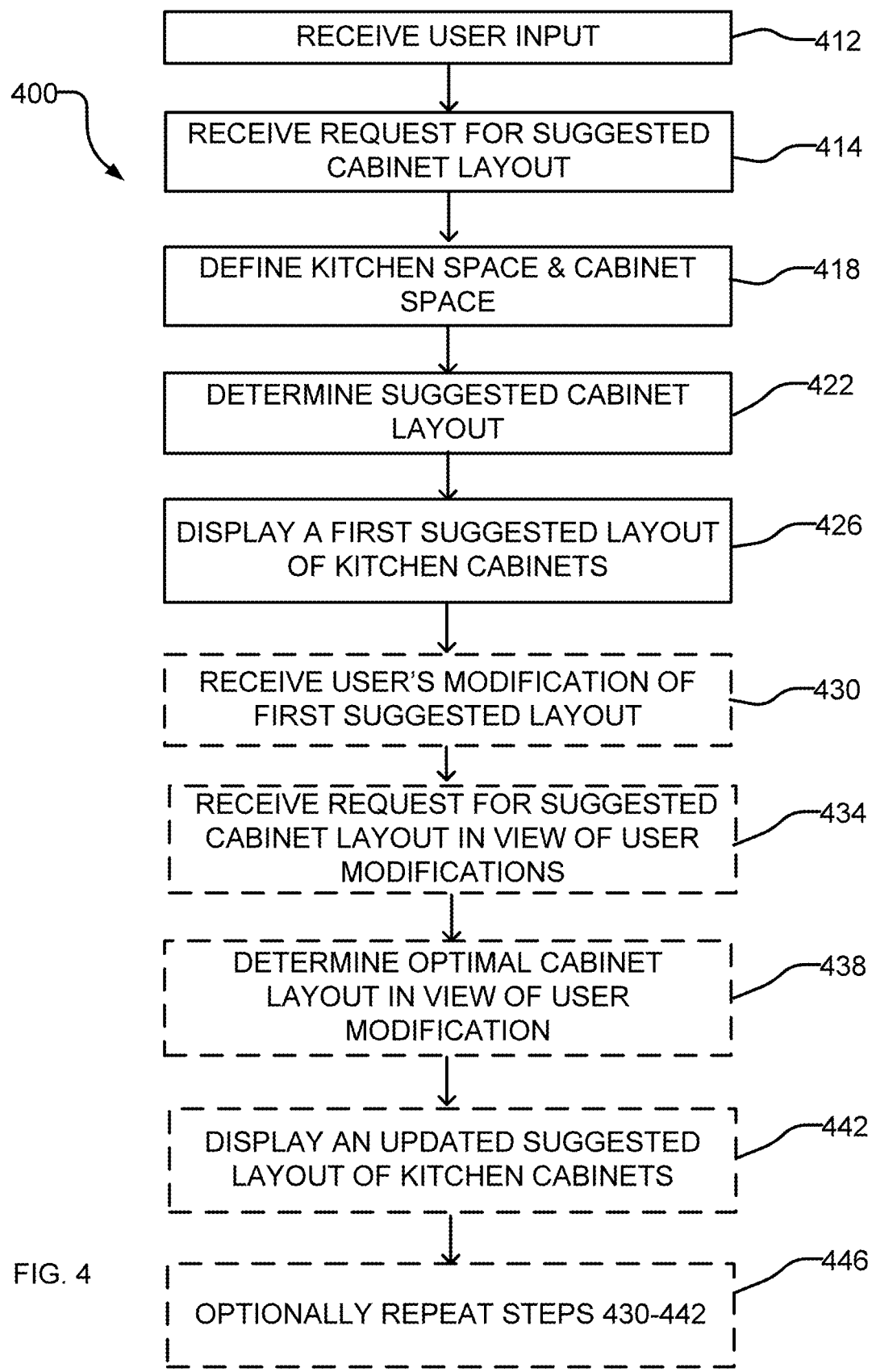
FIG. 4 is a flow diagram of a method for automatically generating kitchen cabinet layouts according to another example embodiment.

FIG. 4 shows a schematic depiction of a computer-implemented method 400 for generating a layout of kitchen cabinets according to another example embodiment. Computer-implemented method 400 is described from the perspective of computer-implemented system 200. For the purposes of explanation, method 400 is described as being implemented by computing device 200, it being understood that with suitable modification method 400 may be implemented by system 100.

Method 400 starts at block 412, where computing device 220 receives user input that defines the attributes of a kitchen and selects appliances, as described above (see, for example, the discussion of blocks 312, 314, 316, 318 of method 300). In some embodiments computing device 220 receives the user's input on location of the selected appliances, whereas in other embodiments computing device 220 automatically positions the selected appliances, as described above.

In particular, as part of block 412, computing device 220 may create a kitchen appliance layout (without cabinets yet). The creation of a kitchen appliance layout may be based on appliance positioning rules stored in and applied by computing device 220. These appliance positioning rules may be at least partially derived from the user-inputted kitchen attributes and the selected appliances themselves. In some embodiments, a kitchen appliance layout may be provided directly by a user (e.g. as a part of block 318).

At block 414, computing device 220 receives a request from the user for a suggested cabinet layout (i.e. to automatically generate a suggested cabinet layout) based on the user input received in block 412. In block 418, computing device 220 defines a cabinet space to be occupied by cabinets. This cabinet space may be defined based on the kitchen attributes and the appliance layout determined or received in block 412.

Once the cabinet space is defined in block 418, at block 422, computing device 220 automatically generates a suggested cabinet layout and, at block 426, displays this suggested cabinet layout to the user (e.g. on device 210 or otherwise). The block 422 suggested cabinet layout may be an optimal cabinet layout, according to some suitable metric(s), which may balance a number of criteria, such as (by way of non-limiting example): functionality of the cabinet layout, visual appearance of a kitchen incorporating the cabinet layout, price of the cabinet layout, sub-combinations of these criteria and/or the like. A variety of techniques can be used to automatically generate cabinet layouts in block 422. The process of automatically generating a suggested cabinet layout in block 422 is described in more detail below.

Computing device displays the block 422 suggested cabinet layout at block 426.

In some embodiments, a plurality of suggested layouts are determined at block 422 and displayed at block 426. For example, block 422 may involve determining a number of possible cabinet layout suggestions according to some ranking threshold and block 426 may involve displaying the plurality of suggested layouts, simultaneously, sequentially or in accordance with user input.

As discussed above in relation to method 300, a user may optionally modify the suggested layout. If the user modifies the block 422 suggested layout, computing device 220 will receive the user's modification at block 430 and receive the user's request to generate a new cabinet layout taking into account the block 430 modifications at block 434. In response to the block 434 request, computing device 220 automatically generates (at block 438) another suggested cabinet layout in view of the block 430 modifications. The block 438 suggested cabinet layout may be displayed to the user at block 442. The block 438 process for generating a suggested cabinet layout may be similar to the process at block 422, except that the block 438 may involve "locking in" the block 430 modification made by the user—i.e. so that the specific modifications made by the user in block 430 are fixed and are not part of the cabinet layout selection process.

In some embodiments, like blocks 422 and 426, blocks 438 and 442 may generate and display a plurality of suggested layouts which incorporate the block 430 modifications.

As shown in block 446 of FIG. 4, the procedures of blocks 430 through 442 may be repeated several times—e.g. until a cabinet layout is suggested that is accepted by the user.

For the purpose of generating cabinet layouts, computing device 220 may represent the cabinet space as a pair of cabinet arrays (upper and lower). The index of each array may represent physical width dimensions. For example, the indices $\{1, 2, 3 \ldots N\}$ of each array may represent one inch physical width intervals, although other (finer or more coarse) physical width intervals could be used. For each index in each cabinet space array, the array may include a cabinet identification (cabinet ID) field that is representative of which cabinet, if any, is located at the physical location corresponding to the index. The cabinets available to computing device 220 for use in automatically generating a cabinet layout may be stored in a cabinet library that is accessible to computing device 220 and each cabinet in the cabinet library may have a unique cabinet ID. Each cabinet ID may itself correspond to an array or record which stores or otherwise represents a number of features of the corresponding cabinet. For example, each cabinet ID may store that its corresponding cabinet is: an upper or lower cabinet; an interior cabinet, a right edge cabinet or a left edge cabinet; a drawer-based cabinet or a door-based cabinet; the cabinet width; and/or the like. For each index in each cabinet space array, the array may also include a kitchen feature field. The kitchen feature field can be used to locate kitchen features, such as, for example, appliances, walls, cabinet edges, windows, plumbing outlets and electrical outlets.

Figure 9A:
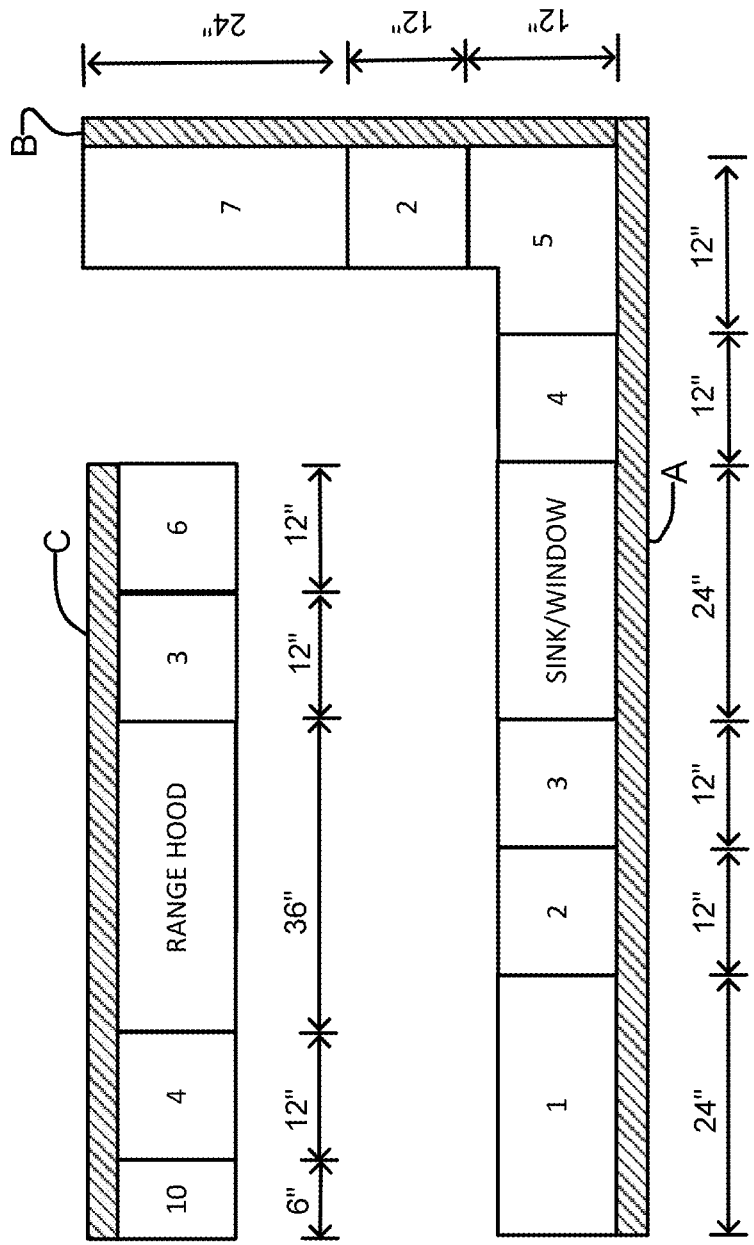
FIGS. 9A and 9B schematically illustrate an example of how a portion of a kitchen including its upper cabinet layout may be represented in array accessible to a computing device according to some embodiments.
Figure 9B:
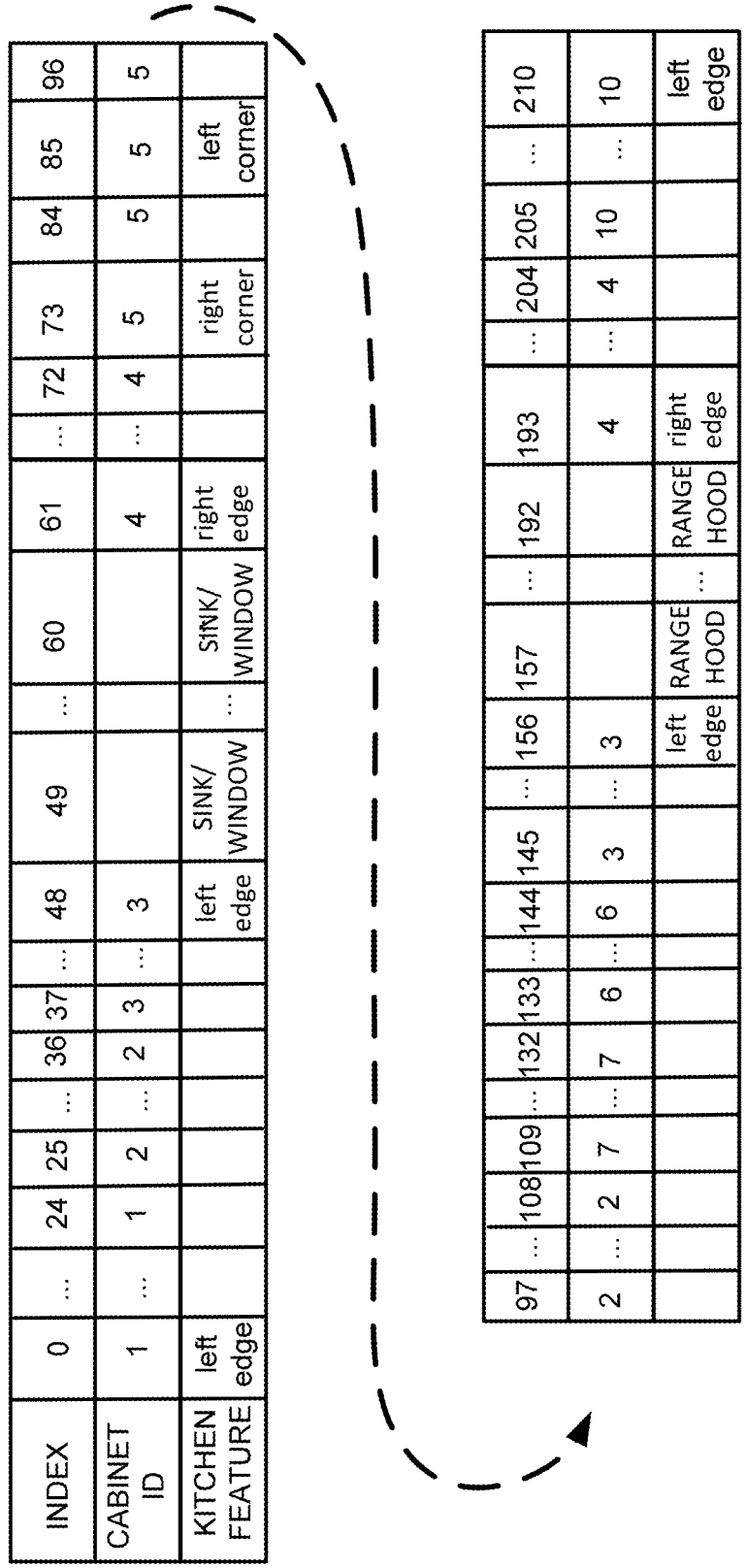

FIGS. 9A and 9B schematically illustrate an example of how a portion of a kitchen including its upper cabinet layout may be represented in array accessible to computing device 220 according to some embodiments. FIG. 9A is a schematic 2D depiction of a portion of a kitchen including a corresponding portion of the upper cabinets, a range hood, and a sink/widow. The upper cabinets are mounted against walls A, B and C. There is an inside corner between walls A and B and wall C is detached from walls A and B.

FIG. 9B shows an array representation of the FIG. 9A kitchen portion according to a particular embodiment. The FIG. 9B array representation concatenates the cabinets and kitchen features of walls A, B and C. The FIG. 9B array includes an index which, in the illustrated example, numbers from 0-228, with each index representative of 1 inch of physical wall width. The FIG. 9B array also includes a cabinet ID field. It can be seen from FIGS. 9A and 9B, that the cabinet ID fields (cabinet IDs 3 and 4) are the same for the left and right edges of the window and the left and right edges of the range hood. FIG. 9B also shows that the same cabinet (cabinet ID 2) is used once on wall A and once on wall B. The FIG. 9B array also includes a kitchen feature field. The kitchen features included in the example embodiment of FIGS. 9A and 9B include: the left edge at index 0 corresponding to the edge of wall A; the left sink edge at index 48, the sink at indices 49-60, the right sink edge at index 61, the right and left corners at indices 84, 85; the right edge at index 132 corresponding to the edge of wall B; the left edge at index 133 corresponding to one edge of wall C; the left range hood edge at index 156; the range hood at indices 157-192; and the right edge at index 228 corresponding to the other edge of wall C.

Figure 5:
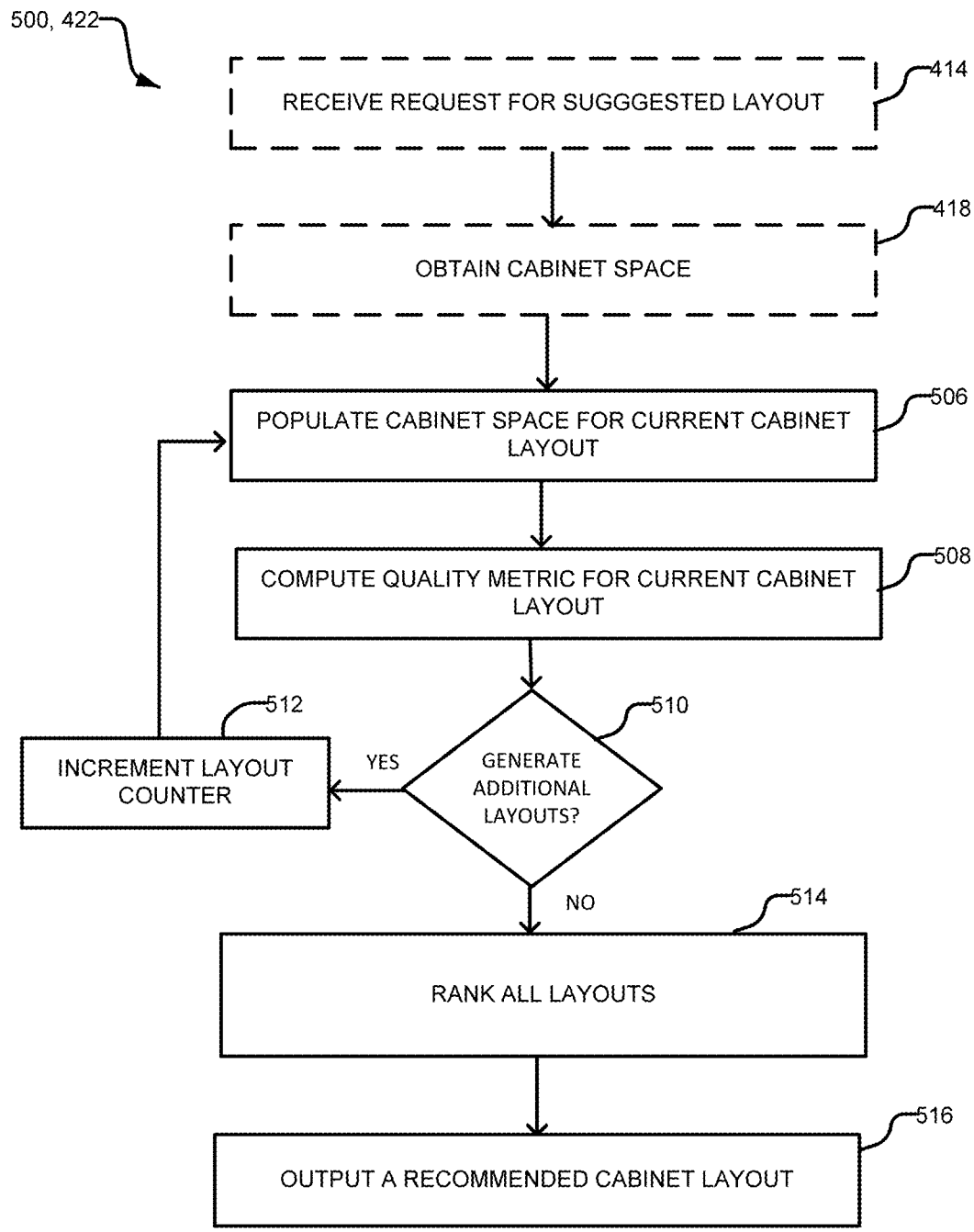
FIG. 5 is a flow diagram of a method for automatically suggesting a cabinet layout which may be used in the methods of FIGS. 3 and 4 according to another example embodiment.

FIG. 5 illustrates a method for 500 for how a suggested cabinet layout may be automatically generated (e.g. in block 422 and/or in block 438) according to one exemplary embodiment. FIG. 5 shows blocks 414 (receiving a user request for a suggested layout) and block 418 (defining or otherwise obtaining a cabinet space) for context, even though these functions may be performed as part of method 400 (FIG. 4). Method 500 may be described as a "brute force" method which involves generating a plurality of possible cabinet layouts, ranking the plurality of generated cabinet layouts, ranking the plurality of generated cabinet layouts and selecting the highest ranking cabinet layout to suggest to the user.

Method 500 starts in block 506 and involves populating the available cabinet space with a particular cabinet layout. Method 500 may involve starting the cabinet layout in one or more corners and then selecting other cabinets from the accessible cabinet library to extend from the corners on an adhoc (e.g. pseudo-random) basis, provided that such other cabinets are selected in compliance with the design rules and cabinet position rules. This process may be repeated as a part of block 506 until the cabinet space is populated with cabinets to provide the current cabinet layout.

As discussed above in connection with FIGS. 9A and 9B, in some embodiments, computing device 220 considers the defined block 418 cabinet space to be an array indexed by a width parameter when performing the procedures of block 506, which may reduce or eliminate the need to assign spatial relationships between cabinets. In some embodiments, computing device 220 populates the defined block 418 cabinet space in block 506 with cabinets whose dimensions are known based on the parameters of such cabinets stored in the library of available cabinets. One such parameter considered by computing device 220 during the block 506 procedure of populating the cabinet space relates to the available width of the defined block 418 cabinet space. The width of the defined cabinet space limits the number of cabinets and the widths of the cabinets to be positioned therein. The sum of the widths of the cabinets selected for a cabinet layout in block 506 must be less than the total width of the cabinet space, but it can be desirable that the sum of the widths of the cabinets be close to the total width of the cabinet space to minimize filler.

In some embodiments, some cabinets in the library have the same depth and same height, but they have different widths. For example, the depth of a typical base (lower) cabinet is 24 inches, the height is 34.5 inches, and the width may vary from 9 inches to 39 inches, in 3-inch increments. In some embodiments, some of the cabinets in the library are dimensioned to house appliances such as hood fans, microwave ovens, wall ovens, sinks and the like. In some embodiments, a user may add cabinets to or remove cabinets from the library of available cabinets.

Other cabinet parameters which may be stored, for each cabinet in the library of available cabinets, include, by way of non-limiting example:
- different sizes, shapes, textures, styles, and colors and/or the like;
- different categories—e.g. upper cabinets, lower cabinets and/or full height cabinets;
- different types such as cupboard, drawer, open, and combinations thereof;
- different materials such as wood, engineered wood, plastic, glass, and combinations thereof.

Method 500 then proceeds to block 508 which involves computing a quality metric for the current cabinet layout (i.e. the cabinet layout generated in the immediately preceding instance of block 506). The quality metric determined in block 508 may be based on a number of criteria, which may include by way of non-limiting example: functionality of the cabinet layout, visual appearance of a kitchen incorporating the cabinet layout, price of the cabinet layout, sub-combinations of these criteria and/or the like.

In some embodiments of block 508, computing device 220 assigns a quality metric v to the current cabinet layout, where the quality metric v may be computed according to:

$$v = k_1 s + k_2 p + k_3 f \quad (5)$$

wherein $k_1 \in \{0,1\}$, $k_2 \in \{0,1\}$, $k_3 \in \{0,1\}$ are configurable constants, s is a symmetry score that measures or otherwise indicates whether the current cabinet layout is visually balanced; p is a price score indicative of a price of the current cabinet layout; and $f$ is a score that measures or otherwise indicates total waste space occupied by filler between cabinets in the current cabinet layout. In some embodiments, the quality metric v is inversely correlated with the desirability of the cabinet layout—that is, a lower value of the quality metric v is associated with a relatively more desirable (higher ranking) cabinet layout and a higher value of the quality metric v is associated with a relatively less desirable (lower ranking) cabinet layout.

The equation (1) symmetry score, s, measures or otherwise indicates whether a layout is visually balanced. In some embodiments, the symmetry score s is inversely correlated with symmetry—i.e. a lower symmetry score s is indicative of greater symmetry and a higher symmetry score is indicative of lower symmetry. The symmetric score assesses the overall visual composition of a cabinet layout, including both the upper cabinets and base cabinets. In some embodiments, the symmetry score s measures whether the upper cabinets align with the base cabinets. In some embodiments, the symmetry score s measures whether the cabinets on one side of a kitchen feature and/or an appliance match the cabinets on the other side of the kitchen feature and/or appliance. For example, the symmetry score s may be relatively low when the cabinets on one side of the stove match the cabinets on the other side or when the cabinets on one side of the sink match the cabinets on the other side and relatively high when either of these sets of cabinets is non-matching.

In some embodiments, the symmetry score s may additionally or alternatively be based on the overall visual composition of a cabinet layout, which, in turn, may be assessed by comparing the widths of cabinet doors. A cabinet layout may have a high degree of symmetry if all of the cabinet doors have the same width. This aspect of the symmetry score s may be calculated by summing the differences of the cabinet door widths in the upper cabinets and in the lower cabinets:

$$s = \sum_{j=1}^{N} \sum_{i=1}^{N} \alpha_{ij} |L_i - L_j| + \sum_{r=1}^{M} \sum_{q=1}^{M} \alpha_{qr} |L_q - L_r| \qquad (6)$$

Where: i, j are indices used for the upper cabinets; q, r are indices used for the lower cabinets; $L_j$ is the width of the $j^{th}$ upper cabinet; $L_i$ is the width of the $i^{th}$ upper cabinet; $L_q$ is the width of the $q^{th}$ upper cabinet; $L_r$ is the width of the $r^{th}$ upper cabinet; N is the number of upper cabinets; M is the number of lower cabinets; $\alpha_{ij}$ are optional configurable weighting constants that may assign relative weights to the symmetry of particular upper cabinet pairs; and $\alpha_{qr}$ are optional configurable weighting constants that may assign relative weights to the symmetry of particular upper cabinet pairs. The lower the symmetric score s, the more likely that a layout is visually balanced.

The equation (1) price score, p, measures the cost of purchasing and/or installing cabinets according to a particular cabinet layout. The price score is calculated by summing the price of each cabinet:

$$p = \sum_{i=1}^{M+N} \beta_i p_i \qquad (7)$$

where $p_i$ is the price of the $i^{th}$ cabinet, M in the number of lower cabinets, N is the number of upper cabinets and $\beta_i$ are optional configurable weighting constants which may assign relative weights to the cost of particular cabinets. The lower the price score p, the more likely a layout is more economically prudent.

Filler space, $f$, measures the total waste space occupied by filler between two cabinets. The filler space is calculated by summing the space of filler:

$$f = \sum_{i=1}^{P} \gamma_i f_i \qquad (8)$$

where $f_i$ is the width of the $i^{th}$ filler element, P is the number of filler elements and $\gamma_i$ are optional configurable weighting constants which may assign relative weights to particular filler elements. The lower the filler space score $f$, the more likely a layout uses its space efficiently. In some embodiments, filler cannot be wider than three inches. This may be implemented as one of the above-discussed cabinet positioning rules and/or design rules.

A linear combination function like equation (1) may not satisfy a user's subjective preference. To overcome such disadvantages, in some embodiments equation (1) may be incorporated into or otherwise evaluated using a nonlinear or neural network, as described in more detail below.

Once the quality metric for the current cabinet layout is determined in block 508, method 500 proceeds to block 510 which involves an inquiry into whether additional cabinet layouts should be generated. Any suitable criteria can be used for the block 510 evaluation. For example, it may be desirable to generate a particular threshold number (e.g. 100 or 1000) possible cabinet layouts as part of method 500. As another example, it may be desirable to continue generate cabinet layouts for a threshold temporal period (e.g. 1 minute) as part of method 500. In general, when implementing block 422 according to the brute force technique of method 500 (the FIG. 5 embodiment) it can be desirable to generate a relatively large number of possible cabinet layouts. This desire may be balanced against the availability of computational resources and the time that it takes to generate such a large number of layouts.

If the block 510 inquiry determines that another cabinet layout should be generated (block 510 YES branch), then method increments the layout counter in block 512 and returns to block 506 for another iteration of blocks 506, 508, 510.

Once a sufficient number of cabinet layouts have been generated (block 510 NO branch), method 500 proceeds to block 514 which involves ranking all of the cabinet layouts generated in the loop of blocks 506, 508, 510. Block 514 may involve ranking the cabinet layouts according to their equation (1) quality metric v, with a lower quality metric v corresponding to a higher ranking.

Method 500 then proceeds to block 516, where the highest ranking cabinet layout may be output for display as a suggested cabinet layout (see block 426). Block 516 may also involve saving the suggested cabinet layout to memory. In some embodiments, a plurality of higher ranking cabinet layouts may be output for display (and saved). For example, cabinet layouts having a quality metric v that is below a threshold value or within a threshold percentage of the lowest quality metric v may be suggested or a particular threshold number (e.g. three) of cabinet layouts may be output (and saved) in block 516.

Method 500, as shown and described above, may be used to implement block 422 of method 400 (FIG. 4). Method 500 may also be used for implementing block 438 of method 400, with the only difference being that particular cabinets that have been placed by a user in block 430 may be fixed—i.e. the cabinet layouts generated in block 506 will all involve the particular cabinets placed by the user in block 430.

In some embodiments, rather than expressly generating a number of cabinet layouts and ranking the cabinet layouts using equation (1) or some other suitable quality metric, computing device 220 may construct the cabinet layout as an optimization problem where equation (1) is a cost function and the recommended cabinet layout is the cabinet layout that minimizes equation (1) or some other suitable cost function subject to constraints, such as, for example, the spatial constraints of the cabinet space and the design constraints of any cabinet positioning rules and/or design rules. Such an embodiment is shown in method 500A of FIG. 5A.

Figure 5A:
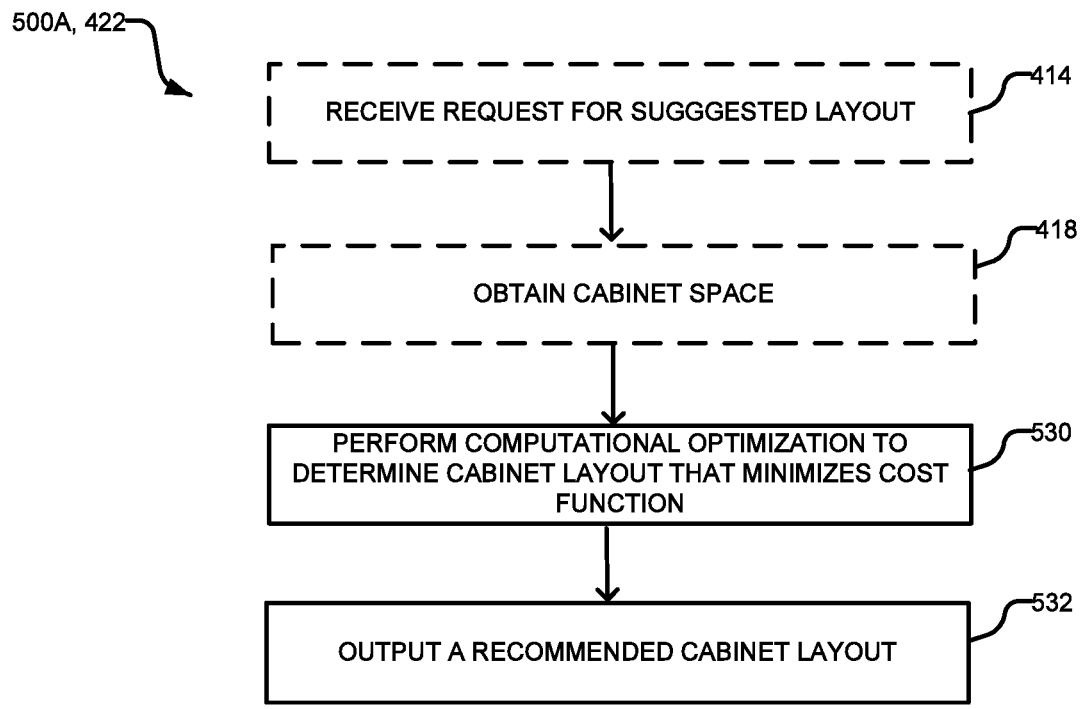
FIG. 5A is a flow diagram of a method for automatically suggesting a cabinet layout which may be used in the methods of FIGS. 3 and 4 according to another example embodiment.

FIG. 5A illustrates a method for 500A for how a suggested cabinet layout may be automatically generated (e.g. in block 422 and/or in block 438) according to one exemplary embodiment. FIG. 5A shows blocks 414 (receiving a user request for a suggested layout) and block 418 (defining or otherwise obtaining a cabinet space) for context, even though these functions may be performed as part of method 400 (FIG. 4).

Method 500A starts in block 530 which involves performing a computational optimization to determine a cabinet layout that minimizes a cost function or equivalently maximizes an objective function. The equation (1) valuation function may be used as a cost function in the block 530 optimization process. The cost function assigns cost based on a number of criteria, including, for example: functionality of the cabinet layout, visual appearance of a kitchen incorporating the cabinet layout, price of the cabinet layout, sub-combinations of these criteria and/or the like. In some embodiments, the block 530 cost function may include a term that assigns cost to a lack of visually appealing appearance and/or symmetry of a particular cabinet layout. An example of such a cost term is described above in equation (2). In some embodiments, the block 530 cost function may include a term that assigns cost to a monetary cost of a particular cabinet layout. An example of such a cost term is described above in equation (3). In some embodiments, the block 530 cost function may include a term that assigns cost to the inefficient use of space and a corresponding lack of functionality (e.g. to an amount of filler). An example of such a cost term is described above in equation (4).

Once the optimization is performed in block 530, then the recommended cabinet layout (as selected by the block 530 optimization) may be output in block 532. The procedures of block 532 may be similar to those of block 516 discussed above.

Considering equation (1) in the context of both method 500 and method 500A, constants $k_1$, $k_2$ and $k_3$ amplify their respective scores, thereby raising or lowering the relative weight of each score (cost term). The values of constants $k_1$, $k_2$ and/or $k_3$ can be changed (e.g. by a user and/or by computing device 220) to reflect a change in relative importance of one or more of the equation (1) scores (cost terms) s, p, f. It will be appreciated that changing the relative weights, $k_1$, $k_2$, $k_3$ may change the layout suggested as the optimal layout. When the relative weights $k_1$, $k_2$, $k_3$ are changed by computing device 220, such changes to the relative weights may be based on past success of a layout being accepted by a user as an optimal layout and/or on past success of layouts being accepted by multiple users as optimal layouts.

In some embodiments, each one of constants $k_1$, $k_2$ and $k_3$ may be set to be the weighted average of past $k_1$, $k_2$ and $k_3$ values of accepted cabinet layouts. In some embodiments, each of constants $k_1$, $k_2$ and $k_3$ take on a value in a range of [0,1] and the sum of $k_1$, $k_2$ and $k_3$ equals 1. Constants $k_1$, $k_2$ and $k_3$ can be assigned manually to reflect a user's preference/priority towards the symmetric score s, the price score p and the filler score f. In some embodiments, the user may be able to set an upper limit for total cost for cabinets, for example using the right hand side of equation (3) without the individual weighting term $\beta_i$. In embodiments like FIG. 5, where a plurality of cabinet layouts are computed and ranked, if the total cost of a given cabinet layout exceeds the upper limit, that layout will not be recommended as an optimal layout. In embodiments like FIG. 5A, where equation (1) is used as a cost function in an optimization problem, the maximum total price can be used as a constraint to the optimization. Computing device 220 may evaluate different combinations of $k_1$, $k_2$, $k_3$ to determine an optimal combination of these parameters. Such evaluation process may be considered to be a parameter tuning process.

Figure 10:
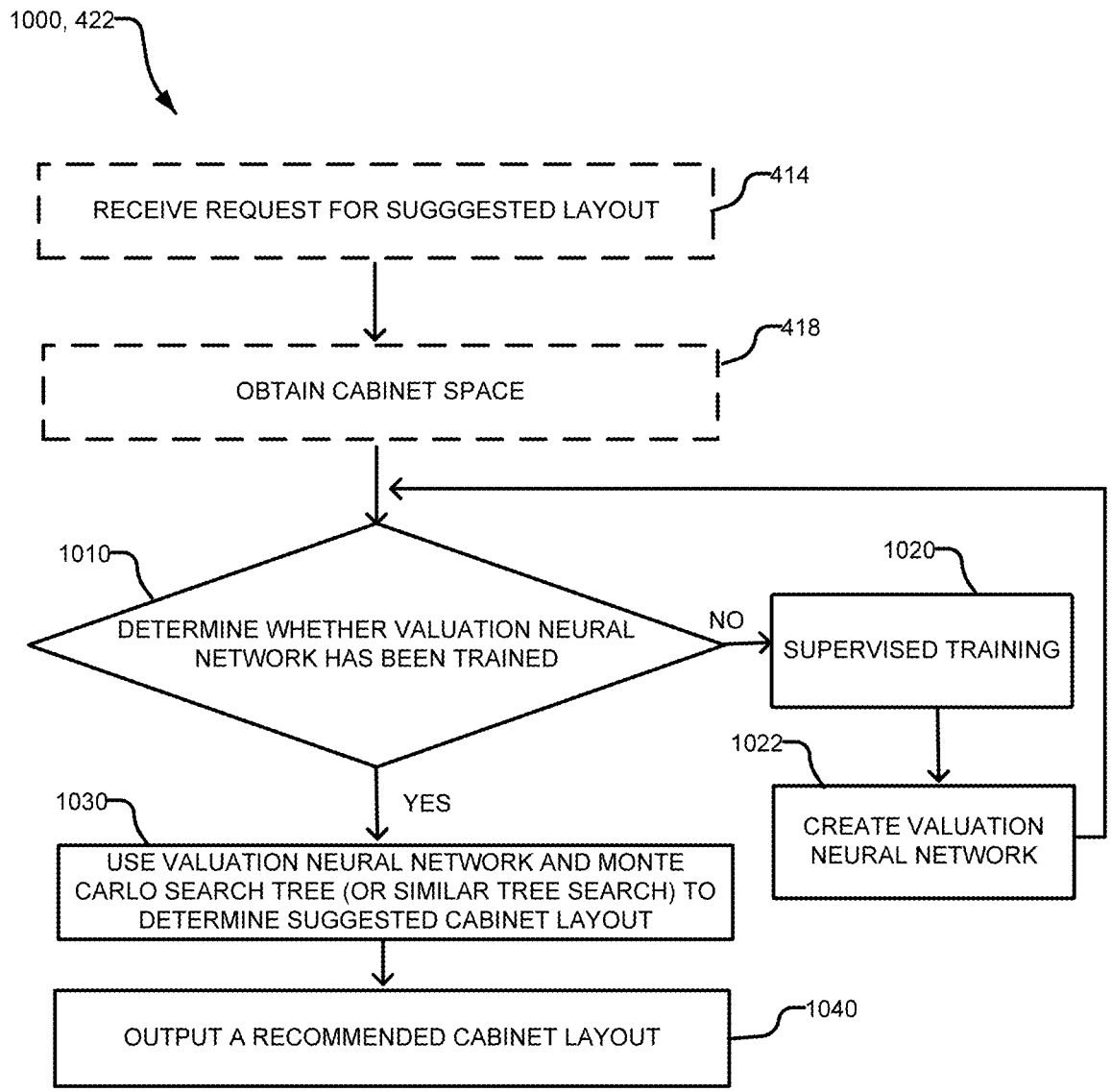
FIG. 10 shows a flow diagram of a method for automatically generating a kitchen cabinet layout which may be used in the methods of FIGS. 3 and 4 according to another example embodiment.

FIG. 10 illustrates another method 1000 for how a suggested cabinet layout may be automatically generated (e.g. in block 422 and/or in block 438) according to one exemplary embodiment. FIG. 10 shows blocks 414 (receiving a user request for a suggested layout) and block 418 (defining or otherwise obtaining a cabinet space) for context, even though these functions may be performed as part of method 400 (FIG. 4). Method 1000 uses a neural-network-based evaluation function combined with a search algorithm to generate a suggested layout of kitchen cabinets.

Method 1000 starts at block 1010 to determine whether a valuation neural network has been trained. If the valuation neural network has not been trained, method 1000 proceeds to block 1020 (NO branch).

Block 1020 involves training a neural network. To train the valuation neural network, computer-implemented system 200 collects (or is provided) a large number of different example cabinet layouts. Some example cabinet layouts may be designed by skilled designers, some example cabinet layouts may be randomly generated by computing device 220, some example cabinet layouts may be generated by an operator of system 200. In general, example cabinet layouts used to train the neural network may be generated in any way. Each example cabinet layout is scored by an experienced human designer and such scores are provided to computing device 220, so that computing device 220 is aware of the correlation between each example cabinet layout and its corresponding score. In one non-limiting example, the range of available scores A is in a range of [0,1].

Computing device 220 may receive the scored example training layouts in the form of indexed arrays (of the form explained above in connection with FIGS. 9A and 9B) or may converts the scored example training layouts into such arrays. The transformed example training layouts form a training set for the valuation neural network. Each one of the transformed example layout is an input object and its corresponding score assigned by a human designer is a desired output value.

Figure 8:
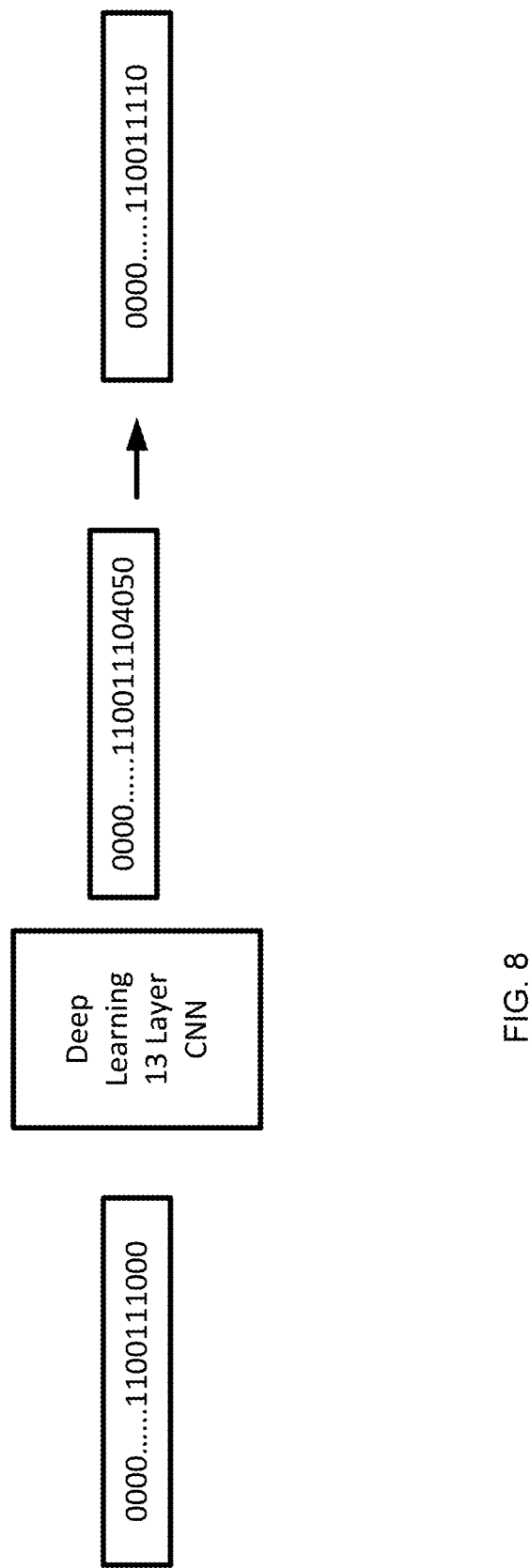
FIG. 8 shows a schematic drawing of a neural network employed in a method for automatically generating a kitchen cabinet layout according to an example embodiment.

At block 1022, the valuation neural network is considered trained when it is capable of mimicking a human designer. That is, the valuation neural network is trained when it is capable of receiving new example cabinet layouts as input and assigning, to the new example cabinet layouts, scores that closely approximate the scores that a human designer would assign. This aspect of the valuation neural network, once trained, may be considered to be an optimal scoring function (also referred to as an objective function). The trained valuation neural network may additionally provide an evaluation function that considers (a) the state of a cabinet space that has been occupied by one or more cabinets, i.e. feature s, and (b) the selection of cabinet to be placed next, i.e. feature a. The value of <s,a> may provide a probability of a layout incorporating feature s and feature a of being recommended as a suggested layout and/or of having a score λ that is above some configurable threshold (e.g. λ>0.9). In some embodiments, the valuation neural network has more than 10 layers. For example, the valuation neural network illustrated in FIG. 8 has 13 layers.

When the valuation neural network has been trained (block 1010 YES branch), method 1000 proceeds to block 1030. At block 1030, method 1000 may use the trained valuation neural network and a Monte Carlo search tree to generate a suggested layout of kitchen cabinets.

Block 1030 may start with a layout comprising a single cabinet in the cabinet space (e.g. typically a corner cabinet and/or a large cabinet) and then may successively add cabinets to the cabinet layout one at a time in accordance with a Monte Carlo search tree technique, where each new cabinet to be added represents a node of the Monte Carlo tree. In some embodiments, the Monte Carlo search tree technique used in block 1030 may try to maximize the score λ that would be provided by the trained neural network for any final cabinet layout. In some embodiments, the Monte Carlo search tree technique used in block 1030 may attempt to generate a cabinet layout for which the trained neural network would assign a score λ that is greater than some configurable threshold (e.g. λ>0.9). Traditional Monte Carlo search tree techniques used in games like Go and the like have binary win/lose outcomes. Consequently, each node on the search tree has an associated probability. Such techniques can be used where a win is considered to be a final cabinet layout with score λ greater than some threshold and a loss is considered to be a score less than the threshold. However, in some embodiments of block 1030, the probability of a win at each node used in a traditional Monte Carlo technique is replaced with an indicator of the likely score λ if the corresponding cabinet is selected to be the next cabinet added. For example, each node may be assigned a score indicator based on some average or weighted average of the scores A associated with cabinet layouts involving selection of that cabinet. In some such embodiments, in accordance with Monte Carlo search tree techniques involving the iterative sub-processes of: selecting; expanding; simulating; and back propagation; the node with the highest score indicator may be selected for each iteration of the sub-processes.

In some embodiments, number of iterations of the Monte Carlo search tree sub-processes (selecting; expanding; simulating; and back propagation) are set to some configurable number Ω (e.g. Ω=five) iterations after which a selection of the next cabinet to add is made. That is, the block 1030 Monte Carlo search tree may consider the next Ω cabinets before selecting a next cabinet to add. The selected next cabinet may then be added to the proposed layout and the Monte Carlo search tree process may begin again starting from the new node (i.e. the node with the selected next cabinet added). In this manner, the Monte Carlo search tree technique is iteratively repeated to select the next cabinet(s) one by one until a complete cabinet layout is achieved.

In some embodiments, before adding each new cabinet at block 1030, the valuation neural network provides the probability of a layout being a recommended layout (e.g. having a score λ greater than some configurable threshold) based on (a) the state of the cabinet space that has been occupied by cabinets, i.e. feature s, and (b) the selection of cabinet to be placed next, i.e. feature a. The valuation neural network may select a cabinet that would maximize the value of <s,a>, thereby resulting in a high probability that its resulting layout would be a recommended layout.

In block 1030, method 1000 uses a Monte Carlo search tree in combination with the trained valuation neural network. The Monte Carlo search tree may provide the probability that a skilled designer would pick and arrange a particular cabinet (from among the available cabinets in a cabinet library) in the defined cabinet space. The search tree may organize successive state of a proposed cabinet layout as a node. The Monte Carlo search tree process may include the steps of selection, expansion, simulation and backpropagation. The Monte Carlo search tree may be used to evaluate the current node's value in the search tree and a look-ahead search is used to select the next cabinet to be placed. When using example cabinet layouts to train the neural network, computing device 220 may be trained to choose a path that will maximize network valuation a_t. Network valuation a_t depends on the calculation result of the valuation network, and the probability is saved. Each cabinet placed in a cabinet space may be regarded as a leaf node of the Monte Carlo search tree. The new node is processed once by the estimated neural network, and the valuation is used as the selection basis. To improve the computational efficiency, each search tree, through a forward-looking search, may search down a plurality (e.g. 5) child nodes and use a weighted the average value of the child nodes as the current node's estimate, and the valuation may be based on a combination of the possible estimates in the node. In some embodiments, the weighted average is determined based at least in part on the evaluation function. The weighted average reflects the probability that a node will be selected. The proportion of the middle may be the probability that the node is selected. The larger the valuation of any particular node, the greater the probability of selection. Nodes may be selected by probability using Monte Carlo simulation.

In some embodiments, computing device 220 updates the Monte Carlo search tree periodically, e.g. after each cabinet is added and/or when a recommended optimal layout is chosen by a user.

In some embodiments, the Monte Carlo search tree used in block 1030 incorporates reverse transmission. For example, when the search reaches a final leaf node, computing device 220 uses the evaluation function to update the estimation of each node and update the parameter values of the entire estimated neural network. The evaluation of a plurality of nodes can be carried out simultaneously. Additionally, the evaluation and construction of nodes can be carried out simultaneously. In other embodiments, stochastic sampling may be used to locate an optimal layout.

In some embodiments, a Cowry search tree can be used in addition to or in the alternative to the Monte Carlo search tree in block 1030. A Cowry search tree is a simplified version of a Monte Carlo search tree which incorporates only simulation selection and back propagation.

In some embodiments, the neural-network-based evaluation function and the search algorithm are assigned equal importance when they are used to generate a suggested layout of kitchen cabinets.

After selecting a recommended neural network in block 1030, the suggested cabinet layout is recommended in block 1040. Block 1040 may be substantially similar to blocks 516, 532 described herein.

Another method for how a suggested cabinet layout may be automatically generated (e.g. in block 422 and/or in block 438) uses a convolutional neural network to generate the first suggested layout of kitchen cabinets. Computing device 220 converts the plurality of one-dimensional indexed arrays (as described for FIGS. 9A and 9B) into images. This can be done by assigning a RGB colour value to each point on the one-dimensional array illustrating the selected cabinet occupying a particular spot in the defined cabinet space. Computing device 220 can then use a convolutional neural network for image processing to compare a layout with a library of optimal layouts and determine the probability that the layout will be recommended as an optimal layout.

Figures 6A, 6B:
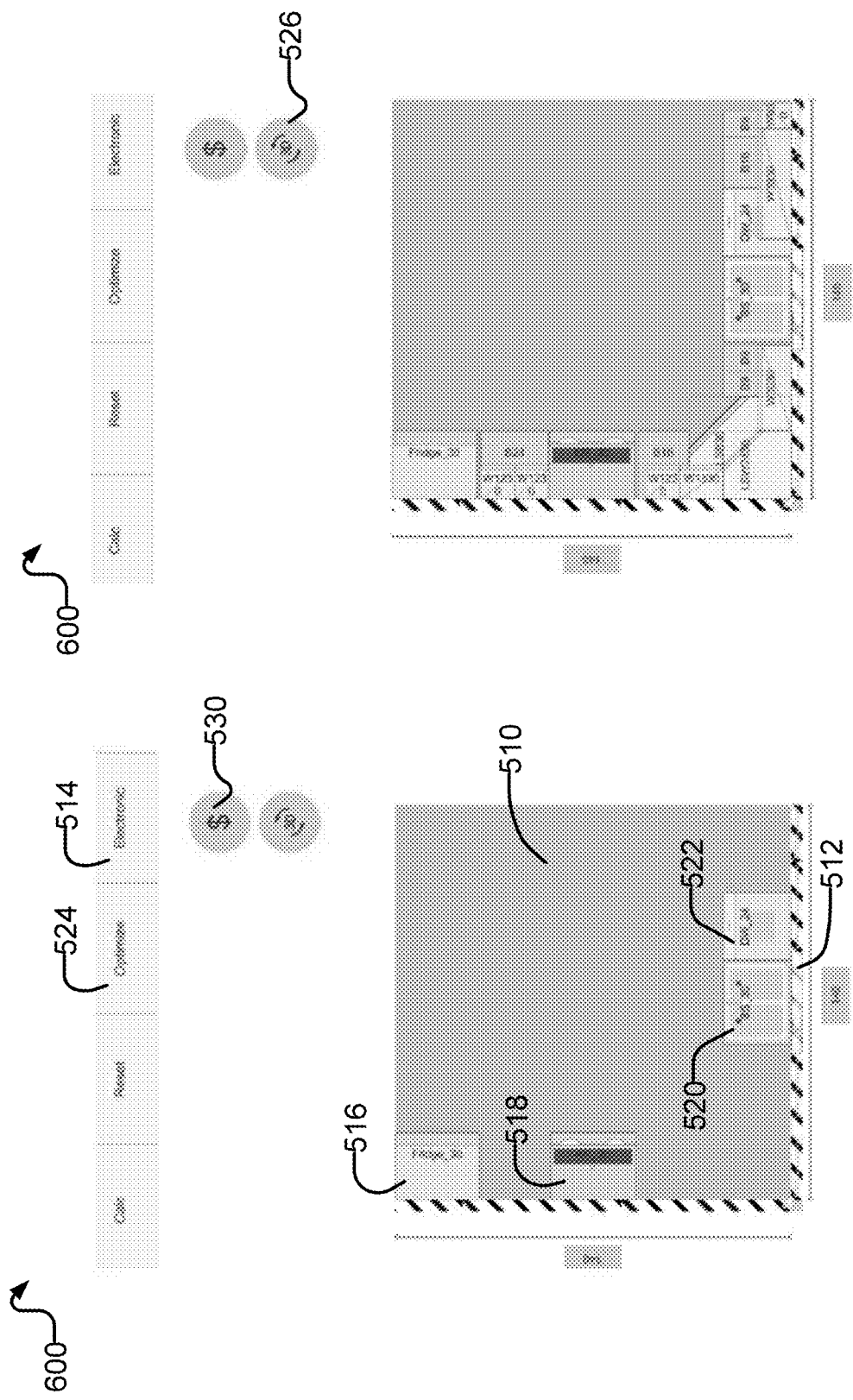
FIGS. 6A and 6B show various screenshots of a mobile application user interface via which the embodiment of FIG. 3 can be practised.
Figure 6C:
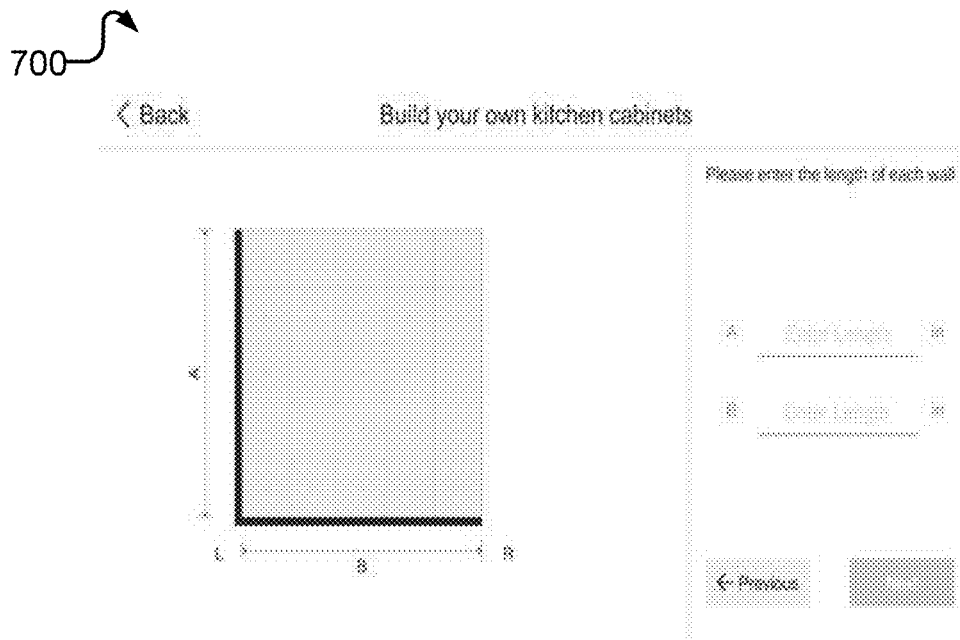
FIGS. 6C-6E show various screenshots of another mobile application user interface via which the embodiment of FIG. 3 can be practised.
Figure 6D:
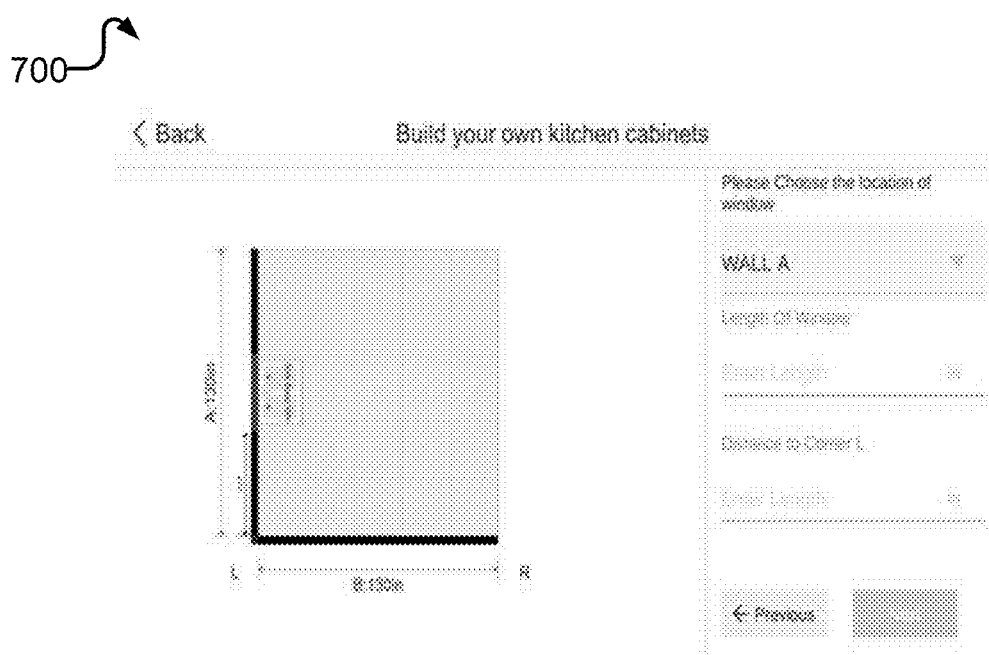
Figure 6E:
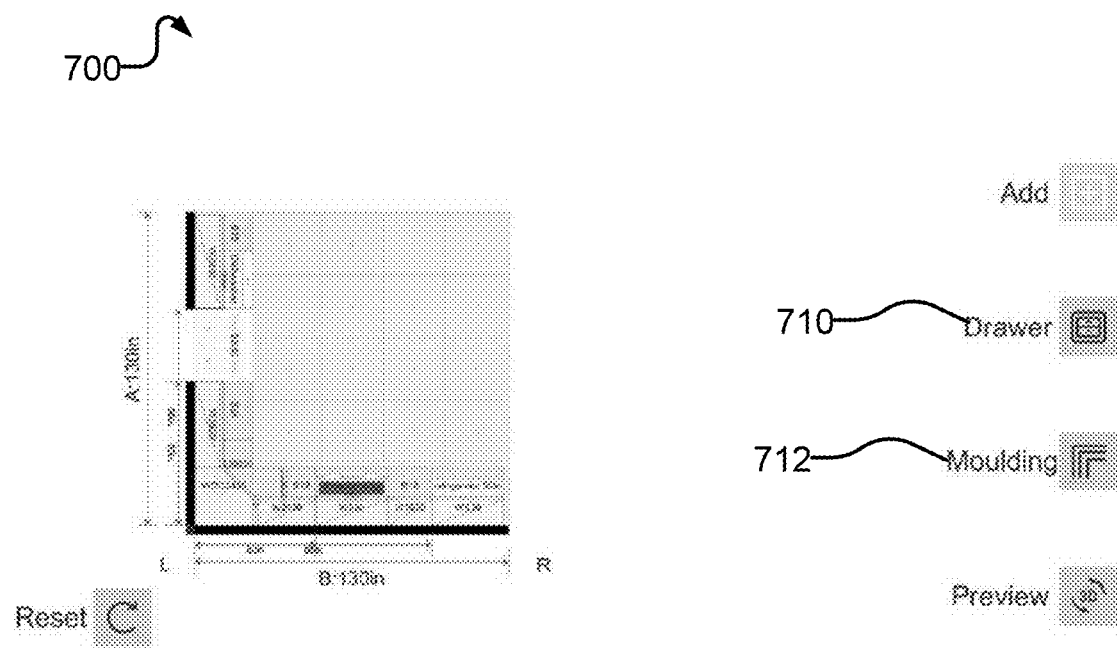
Figure 7A:
FIGS. 7A and 7B show screenshots of a mobile application user interface displaying a recommended kitchen layout in a three-dimensional manner.
Figure 7B:

FIGS. 6A and 6B and 7B show various screenshots of a mobile application user interface 600 via which the embodiment of FIG. 3 can be practiced.

User interface 600 provides a design area 510, showing a kitchen constructed based on defined kitchen attributes/parameters as described in blocks 312, 314, and 316. The user is able to input kitchen floor and wall (e.g. volume) dimensions and kitchen window and pass through dimensions and locations. The illustrated example shows an L-shaped kitchen with two 140" walls. One of the walls has a window 512.

User interface 600 provides a library of appliances. To assess the library, the user touches the Electronic icon 514. The user can choose an appliance from the library and position the appliance in the kitchen at a desired location. The illustrated example shows that the user positioned a sink 520 underneath window 512. A dishwasher is positioned beside sink 520. A fridge 516 is positioned at a corner and a kitchen stove 518 is positioned apart from fridge 516.

To request a suggested layout of kitchen cabinets, the user touches the Optimize icon 524. Such request prompts the computing device 220 to automatically populate the kitchen with cabinets and displays a recommend layout schematically as shown in FIG. 6B. To better visualize the suggested cabinet layout, the user can touch the 3D icon 526 and user interface 600 then displays the suggested cabinet layout in a three-dimensional manner as shown in FIG. 7B.

If the user accepts the suggested layout, the user is able to place an electronic purchase order for the cabinets by touching the $ icon 530.

FIGS. 6C to 6E and 7A show various screenshots of another mobile application user interface 700 via which the embodiment of FIG. 3 can be practiced. User interface 700 is similar to user interface 600. However, user interface 700 enables a user to define a specific style of cabinet. For example, the user can touch the Drawer icon 710 to choose a cabinet with drawers instead of a cabinet with a door. The user can touch the Moulding icon 712 to choose a cabinet with crown moulding.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A computer-implemented method for generating a suggested layout of kitchen cabinets, the method comprising:
   receiving, by a computer, spatial attributes of a virtual kitchen;
   receiving, by the computer, positional and dimensional information relating to appliances selected by a user;
   based on the received attributes of the kitchen and the information relating to the user-selected appliances, defining, by the computer, a cabinet space to be occupied by kitchen cabinets;
   selecting, by the computer, cabinets from among a plurality of cabinets in a cabinet library accessible to the computer and thereby automatically generating, by the computer, a first suggested layout of cabinets that occupies the cabinet space; and
   displaying, by the computer, the first suggested cabinet layout either in a two- or three-dimensional manner;
   wherein generating, by the computer, the first suggested layout comprises:
   training, by the computer, an artificial neural network to predict a score for a given input cabinet layout, wherein training the artificial neural network comprises providing the artificial neural network with a plurality of example training layouts which have been scored by human experts; and
   starting from a first cabinet, iteratively selecting a next cabinet to be added until the first suggested layout is complete, wherein selecting the next cabinet to be added comprises performing a Monte Carlo search tree process to determine the next cabinet to be added, the Monte Carlo search tree process based on scores provided by the artificial neural network.

2. A computer-implemented method as defined in claim 1, the method comprising:
   receiving, by the computer, a user-modification of the first suggested layout, the user modification comprising a change of at least one cabinet relative to the first suggested cabinet layout; and
   selecting, by the computer, cabinets from among the plurality cabinets in the cabinet library accessible to the computer and thereby automatically generating, by the computer, a second suggested layout of cabinets that occupies the cabinet space;
   wherein the second suggested cabinet layout comprises the change of the at least one cabinet relative to the first suggested cabinet layout.

3. A computer-implemented method as defined in claim 2, wherein generating, by the computer, the second suggested layout comprises starting from the change of the at least one cabinet relative to the first suggested cabinet layout, iteratively selecting a next cabinet to be added until the second suggested layout is complete, wherein selecting the next cabinet to be added comprises performing a Monte Carlo search tree process to determine the next cabinet to be added, the Monte Carlo search tree process based on scores provided by the artificial neural network.

4. A computer-implemented method as defined in claim 2, the method comprising representing, by the computer, the first suggested cabinet layout as an upper cabinet array and a lower cabinet array, each of the upper and lower cabinet arrays indexed by an index corresponding to a width dimension and including, for each index in the upper and lower cabinet arrays, the upper and lower cabinet arrays comprise a cabinet identifier that identifies a cabinet from within the cabinet library.

5. A computer-implemented method as defined in claim 4 wherein for each index in the upper and lower cabinet arrays, the upper and lower cabinet arrays comprise a kitchen feature field which includes information about kitchen features in the cabinet space.

6. A system comprising a suitably configured processor and a display, the system configured to perform the method of claim 1.

7. A non-transitory computer-readable medium including instructions that, when executed by a processor, cause the processor to implement the method of claim 1.

8. A computer-implemented method as defined in claim 1, the method further comprising:
- receiving, by the computer, a user-modification of the first suggested layout, the user modification comprising a change of at least one cabinet relative to the first suggested cabinet layout; and
- selecting, by the computer, cabinets from among the plurality cabinets in the cabinet library accessible to the computer and thereby automatically generating, by the computer, a second suggested layout of cabinets that occupies the cabinet space;
- wherein the second suggested cabinet layout comprises the change of the at least one cabinet relative to the first suggested cabinet layout.

\* \* \* \* \*